US012441381B1

(12) United States Patent
Stiggers et al.

(10) Patent No.: US 12,441,381 B1
(45) Date of Patent: Oct. 14, 2025

(54) DOLLY WITH CLAMPING MECHANISM(S)

(71) Applicant: Amazon Technologies, Inc., Seattle, WA (US)

(72) Inventors: Mark Stiggers, Cincinnati, OH (US); Shailesh Kumar, Seattle, WA (US); Anthony Guobin Chan, SeaTac, WA (US); David Thomas Over, Buckley, WA (US)

(73) Assignee: Amazon Technologies, Inc., Seattle, WA (US)

( * ) Notice: Subject to any disclaimer, the term of this patent is extended or adjusted under 35 U.S.C. 154(b) by 405 days.

(21) Appl. No.: 18/122,026

(22) Filed: Mar. 15, 2023

(51) Int. Cl.
B62B 3/04 (2006.01)
B62B 5/00 (2006.01)

(52) U.S. Cl.
CPC .............. B62B 3/04 (2013.01); B62B 5/00 (2013.01); B62B 2203/44 (2013.01); B62B 2203/74 (2013.01)

(58) Field of Classification Search
CPC ......... B62B 3/04; B62B 5/00; B62B 2203/44; B62B 2203/74
See application file for complete search history.

(56) References Cited

U.S. PATENT DOCUMENTS

| 3,400,942 | A | * | 9/1968 | Hull ..................... B62B 5/0083 280/35 |
| 4,541,768 | A | * | 9/1985 | Walker .................... B64F 1/322 414/535 |
| 11,667,228 | B2 | * | 6/2023 | Hoeper ................ B62D 53/005 410/94 |
| 12,252,342 | B2 | * | 3/2025 | Solovianenko ........... B66F 9/18 |
| 2024/0416985 | A1 | * | 12/2024 | Abraham ................ B62B 3/005 |

* cited by examiner

Primary Examiner — Bryan A Evans
(74) Attorney, Agent, or Firm — Eversheds Sutherland (US) LLP

(57) ABSTRACT

A device includes a deck configured to receive a container and a clamping mechanism configured clamp the container to the deck and unclamp the container from the deck. The clamping mechanism has one or more first fingers and one or more second fingers. The one or more first fingers are actuatable between a first position to clamp the container to the deck, and a second position to unclamp the container from the deck. The one or more second fingers are actuatable between a third position to clamp the container to the deck, and a fourth position to unclamp the container from the deck. The device further includes a button to at least partially control an actuation of at least one of the one or more first fingers or the one or more second fingers, a lighting element configured to illuminate according to an operational status of the clamping mechanism.

20 Claims, 17 Drawing Sheets

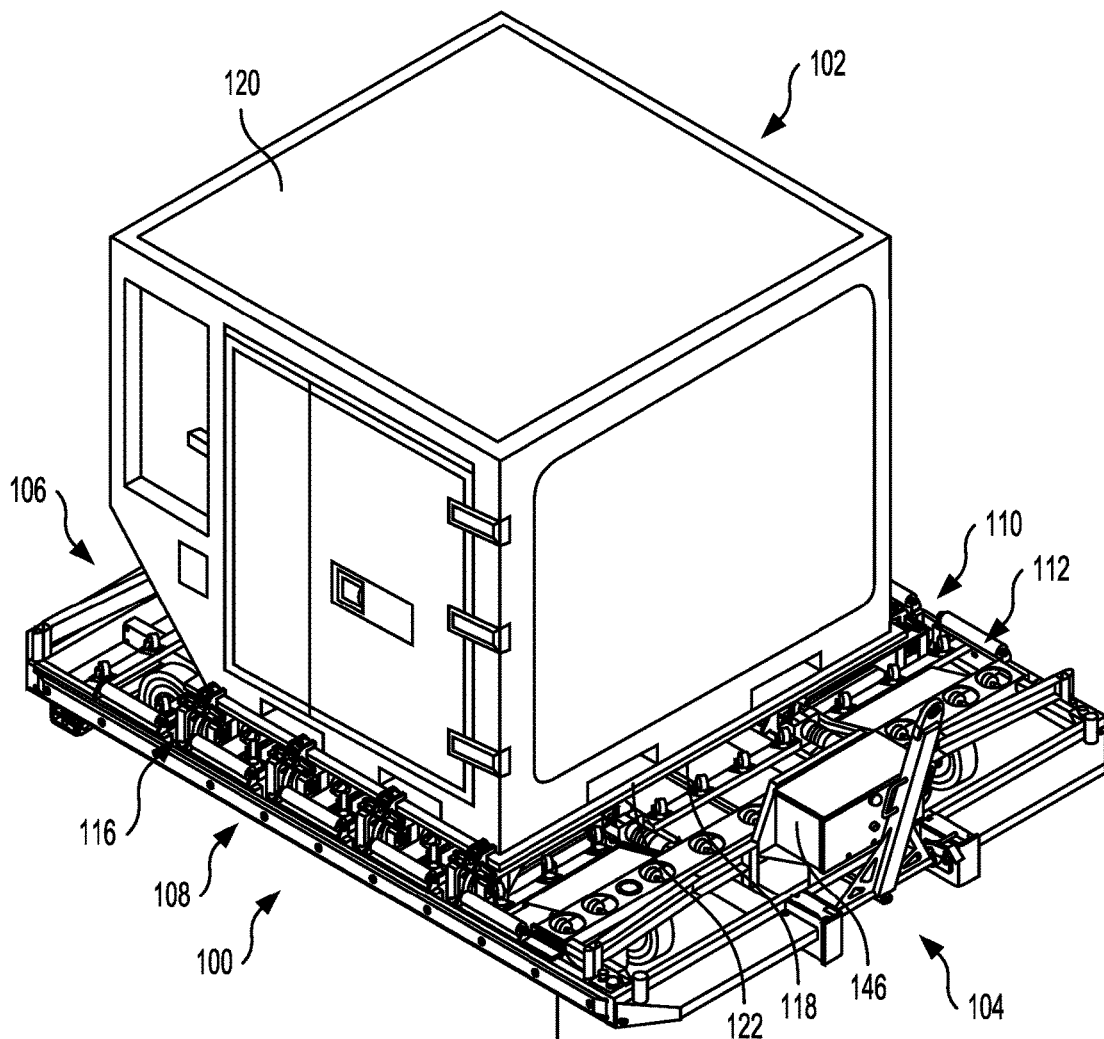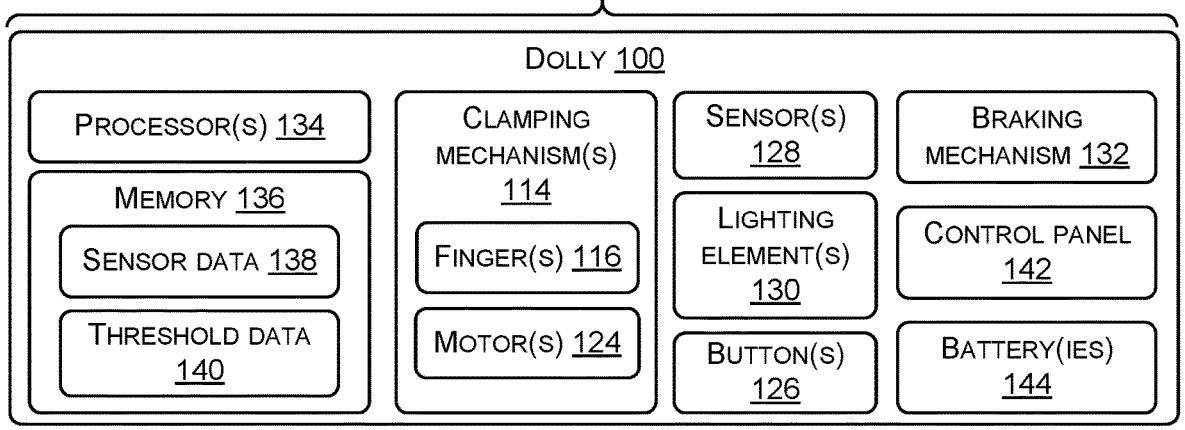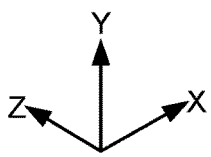
FIG. 1

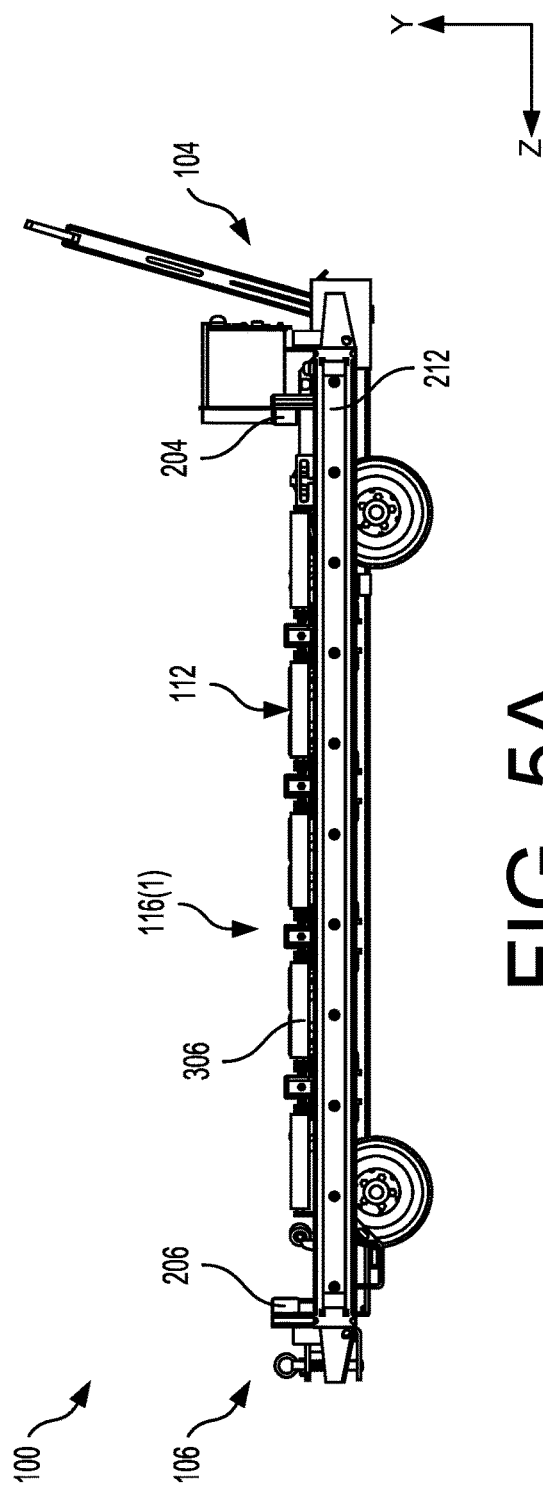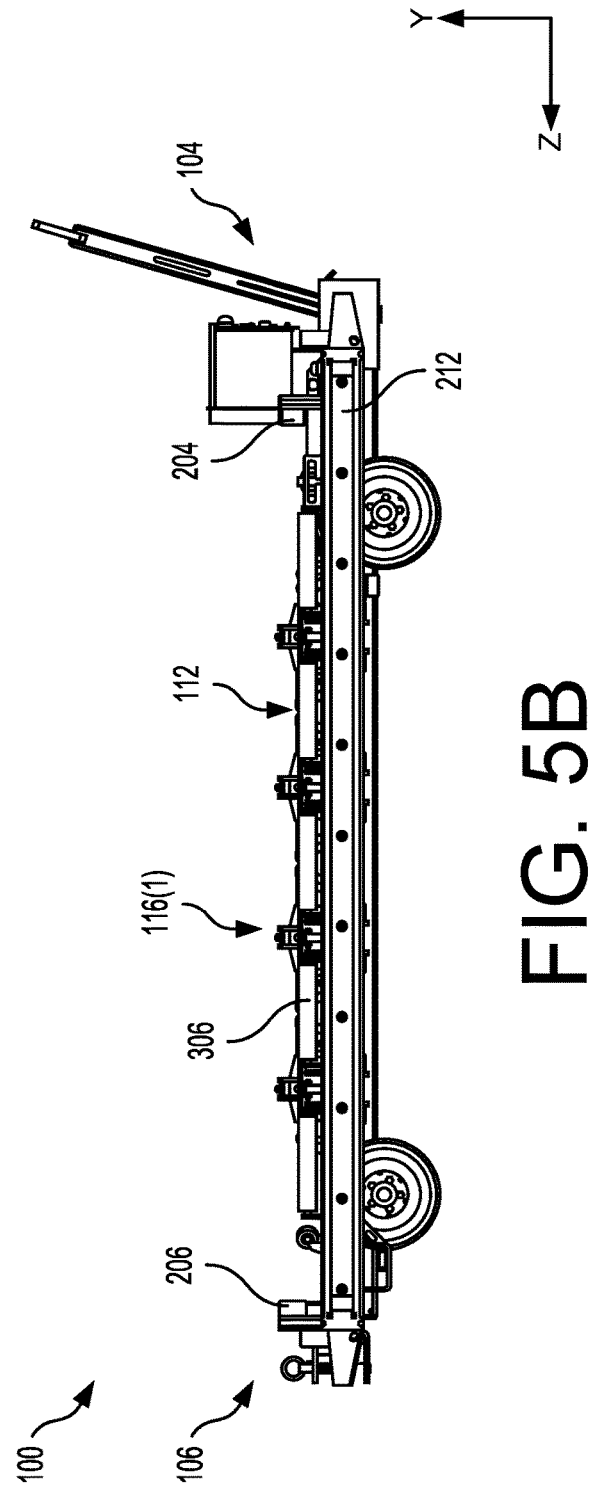

DOLLY WITH CLAMPING MECHANISM(S)

BACKGROUND

Dollies, pallet jacks, or other moveable platforms are used to transport containers, bins, boxes, and the like. For example, packages or items may be loaded into the container, and thereafter, the container may be transferred (e.g., loaded) onto the dolly. In some instances, the containers may be secured to the dolly during transport. However, during transport, the container may become unsecured from the dolly, leading to potential injury or decreased throughput.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 1 illustrates a perspective view of an example dolly configured to clamp an example unit load device (ULD) using example clamping mechanism(s), according to an example of the present disclosure.

FIG. 5A illustrates a side view of the dolly of FIG. 1, showing the clamping mechanism(s) in an unclamped state, according to an example of the present disclosure.

FIG. 5B illustrates a side view of the dolly of FIG. 1, showing the clamping mechanism(s) in a clamped state, according to an example of the present disclosure.

DETAILED DESCRIPTION

Figure 2A:
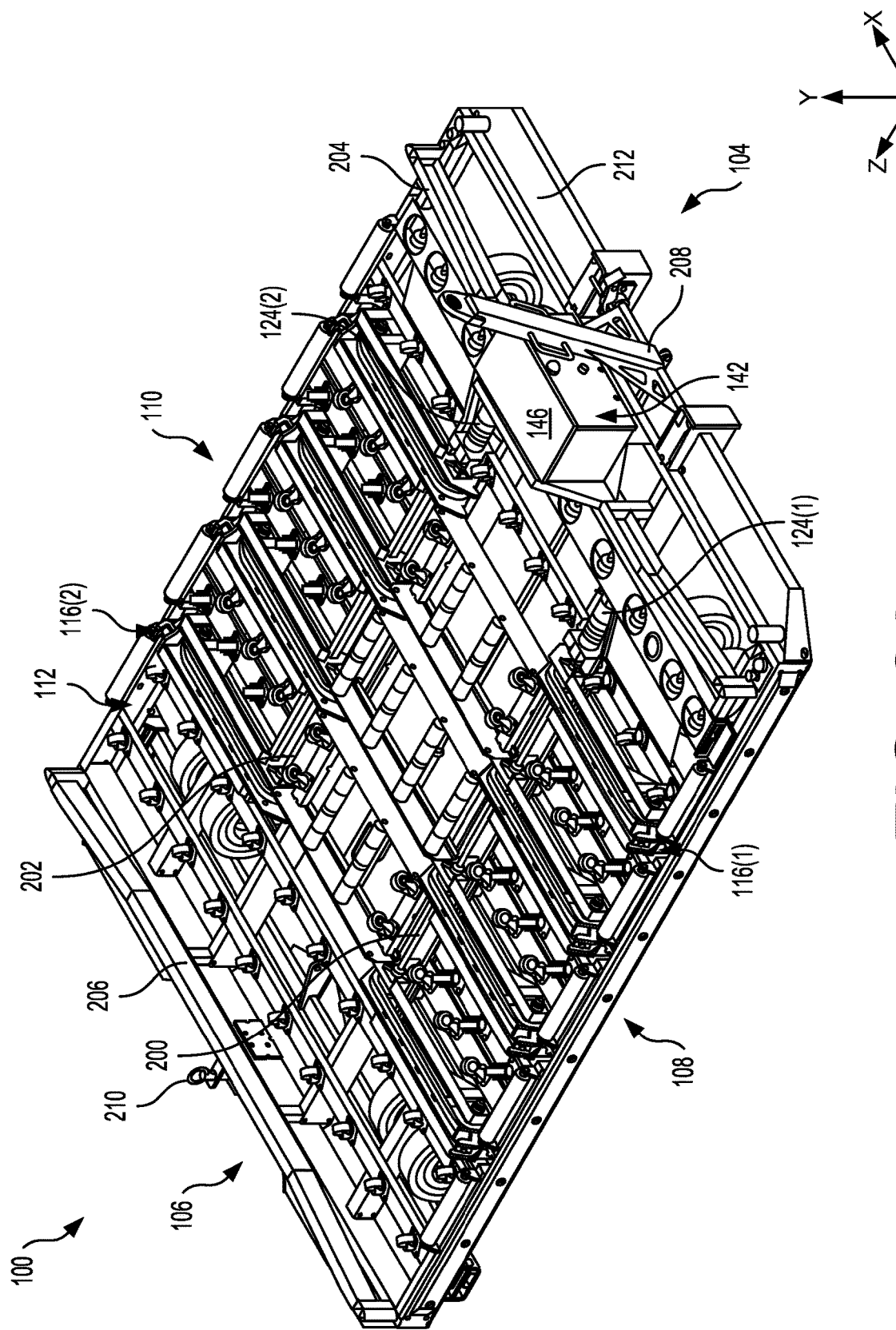
FIG. 2A illustrates a perspective view of the dolly of FIG. 1, showing the clamping mechanism(s) in an unclamped state, according to an example of the present disclosure.

This application is directed, at least in part, to a dolly configured to transport a unit load device (ULD). In some instances, the dolly may represent a towable trailer or platform having wheels. The dolly may be configured to be towed or otherwise moved by personnel, vehicles (e.g., tractors), and so forth. In some instances, the dolly may include a deck configured to receive the ULD, and clamping mechanism(s) that secure the ULD to the deck, or more generally, the dolly. For example, once loaded onto the deck, the clamping mechanism(s) may be actuated to secure the ULD to the dolly. Once transported, the clamping mechanism(s) may release such that the ULD may be unloaded. In some instances, during loading, transport, and unloading, the dolly may provide indications as to whether the ULD is secured to dolly, such as whether the clamping mechanism(s) remain clamped to the ULD. Accordingly, the dolly may be used to safely and conveniently transport ULDs, and/or may increase a throughput of processing the ULDs.

ULDs are conventionally used in logistics, travel, shipping, and so forth to carry or otherwise transport luggage, freight, mail (e.g., boxes, envelopes, etc.), and other cargo on aircraft. For example, the ULDs may be loaded with goods, and thereafter, loaded onto an aircraft. The ULDs may have surfaces that are engageable by the clamping mechanism(s) for securing ULDs to the dolly. As an example, a base of the ULDs may include a lip (e.g., flange, frame, etc.) that extends around a perimeter of the base, or a portion of the perimeter of the base. The lip of the ULD may be engaged by the clamping mechanism(s) for securing the ULD to the dolly.

The deck of the dolly, in some instances, may include a plurality of rollers (e.g., cylindrical rollers), wheels (e.g., cylindrical, caster, etc.), and so forth. The ULD may rest on the plurality of rollers and/or wheels such that the ULD may be conveniently loaded onto the dolly, unloaded from the dolly, repositioned on the dolly, and so forth. Additionally, in some instances, the dolly may include bulkheads that assist in loading the ULD onto the deck. The bulkheads may be disposed adjacent to the deck, and in some instances, may be tapered to help funnel the ULD onto the deck.

The clamping mechanism(s) may include fingers (e.g., hooks, grippers, etc.) that engage with the lip of the ULD. The clamping mechanism(s) may include any number of fingers for engaging with the ULD. The fingers may be moveable between a clamped position in which the fingers are engaged with the ULD, and an unclamped position in which the fingers are disengaged with the ULD. For example, the fingers may be moved from the unclamped position to the clamped position to clamp to the lip of the ULD. Initially, however, when the ULD is loaded onto the dolly, the fingers may be in the unclamped position and not engaged with the lip of the ULD. In the unclamped position, the fingers may be disposed beneath the deck such that the fingers do not inhibit the ULD being loaded onto the dolly. Additionally, the fingers are disposed between the deck in the unclamped position to permit the ULD to be unloaded from the dolly. Once loaded, however, the fingers may be moved to the clamped position in order to secure the ULD to the dolly. Although the clamping mechanism(s) are discussed herein as being fingers that engage with the ULD, the clamping mechanism(s) may additionally or alternatively include other members, features, etc. for engaging with the ULD (or other containers). For example, the clamping mechanism(s) may include hooks, suctions, bars, and the like that engage with the ULD for securing the ULD to the dolly. In such instances, the clamping mechanism(s) may engage with the lip of the ULD, or other surfaces of the ULD.

In some instances, the fingers are actuatable via a series of motors, chains, and sprockets. For example, the fingers may be disposed on a chain. The sprockets may be engaged with the chain and the sprockets may be disposed along a shaft coupled to a motor. Actuation of the motor may rotate the shaft, and correspondingly, the sprocket may rotate to move the chain. As the chain moves about the sprockets, the fingers may move between the clamped position and the unclamped position. For example, the motor(s) may be actuated in a first direction to move the fingers from the unclamped position to the clamped position, and in a second direction to move the fingers from the clamped position to the unclamped position.

In some instances, the fingers may be disposed on individual chains, and the individual chains may be engaged by two sprockets. For example, a first sprocket may be disposed on the shaft that operably couples to the motor. The first sprocket may represent a driver sprocket that powers (e.g., drives) the chain. A second sprocket may be spaced apart from the first sprocket and represent a driven sprocket. As the motor is actuated, the first sprocket drives the chain around the second sprocket to move the fingers between the clamped position and unclamped position, respectively.

In some instances, the dolly includes first clamping mechanism(s), or first fingers, located on a first side of the dolly, and a second clamping mechanism(s), or second fingers, located on a second side of the dolly. In some instances, the first fingers are actuated by a first motor of the dolly, and the second fingers are actuated by a second motor of the dolly. The first motor may operably couple to a first shaft, about which driver sprockets of the first fingers are disposed, and the second motor may couple to a second shaft, about which driver sprockets of the second fingers are disposed. The driven sprockets of the first fingers and the second fingers may be disposed about axles to permit their rotation as the motor(s) are respectively actuated. As noted above, in some instances, the first fingers and the second fingers may include four fingers. As such, during actuation of the first motor, the four first fingers may move and during actuation of the second motor, the four second fingers may move. However, the first fingers and/or the second fingers may include more than or less than four fingers, respectively. Additionally, in some instances, the first fingers may include a different amount of fingers as the second fingers. Further, the first motor and the second motor may be independently actuatable such that the first fingers and the second fingers move in response to actuation of the first motor and the second motor, respectively.

In some instances, the dolly may include one or more computing devices, input/output (I/O) components, sensor(s), and the like that at least partially control an operation of the fingers. For example, the I/O components may represent buttons, levers, switches, touch screens, and so forth that actuate the motors for controlling the clamping mechanism(s). In some instances, the dolly may include first I/O components that control (e.g., clamp and unclamp) the first fingers, and a second I/O components that control (e.g., clamp and unclamp) the second fingers. For example, the first side may include a first button corresponding to an clamp/unclamp button and a second button corresponding to an emergency stop button. In instances in which the first button is pressed, the first fingers may be actuated via the first motor. The second button, meanwhile, may engage a braking mechanism of the dolly to halt a movement of the dolly, for example, in response to the ULD being unclamped on the dolly. The second side may include a third button corresponding to an clamp/unclamp button and a fourth button corresponding to an emergency stop button. The third button may function similar to the first button on the first side, and the fourth button on the second side may function similar to the second button the first side. As such, the first fingers may be actuated via the first button on the first side, and the second fingers may be actuated via the third button on the second side. However, although the first fingers and the second fingers are described as being independently actuatable, in some instances, the first fingers and the second fingers may be operated in conjunction with one another.

In some instances, the first button and the third button, for example, may be used to semi-autonomously clamp and unclamp the fingers to and from the ULD, respectively. For example, in response to pressing the first button or the third button, the dolly may operate to either clamp or unclamp the ULD. In some instances, the dolly may also include a control panel having additional buttons that may be used to manually clamp and unclamp the fingers from the ULD. For example, buttons may be disposed on the control panel to operate the first fingers and the second fingers, either to the clamped position or the unclamped position. Additionally, the control panel may include a button, for example, for configuring the dolly between a manual operation in which the personnel uses the control panel to clamp and unclamp the ULD, and when the dolly operates semi-autonomously to clamp and unclamp the ULD (via the first button and the third button).

The I/O components may also include lighting elements that illuminate according to operations being performed by the dolly, positions of the fingers, or according to certain states of the dolly. In some instances, the lighting elements may be disposed beneath the first button and the third button, respectively. A cover of the first button and a cover of the third button may be clear or opaque such that light emitted by the lighting element may be emitted into the environment. The lighting elements may illuminate to a first color (e.g., yellow) in response to a button press of the first button or the third button. For example, pressing the first button or the third button to unclamp the ULD from the dolly may cause a lighting element below the first button and/or a lighting element below the third button to illuminate yellow, respectively. Once the fingers have moved from the clamped position to the unclamped position, the lighting elements may illuminate to a second color (e.g., orange), for example, to signify that the ULD may be unloaded form the dolly. In some instances, the lighting elements may illuminate or blink orange for a threshold amount of time (e.g., ten seconds, thirty seconds, one minute, etc.) to indicate that the first fingers or the second fingers are about to move. For example, the lighting element may illuminate orange to signify when the clamping mechanism(s) are moving from the clamped position to the unclamped position, or from the unclamped position to the clamped position. The lighting elements may also illuminate green after the clamping mechanism(s) have moved to the unclamped position (e.g., after illuminating yellow). Additionally, the lighting elements may illuminate to the third color (e.g., green) when the clamping mechanism(s) are in the unclamped position, and after illuminating to the second color for the threshold amount of time.

In some instances, sensor(s) are used to determine whether the ULD has been successfully clamped to or successfully unclamped from the dolly. For example, sensor(s) may measure a current draw on the motor(s), a resistance applied to the motor(s), a pressure applied by the finger(s), and so forth. If the current draw on the motors is within a threshold range, the fingers may be determined to have engaged with the ULD. That is, when engaged and holding the ULD, the motor may apply a certain force to secure the fingers in place in order to prevent the ULD moving. Comparatively, if the current draw on the motors is less than the threshold range, this may indicate that one of the fingers has not clamped onto the ULD. For example, one of the fingers may have passed underneath the ULD during clamping. Accordingly, when the finger(s) are successfully clamping the ULD, the motor(s) may be applying a certain amount of pressure to the ULD, and the draw on the motor may be used to determine whether the ULD has been successfully clamped. The draw on the first motor and the second motor may be determined in order to identify whether the first fingers and the second fingers have successfully or unsuccessfully clamped the ULD, respectively.

In addition to the current draw of the motors, the sensor(s) may measure a travel distance of the fingers. For example, from the unclamped position to the clamped position, the fingers may have a range of travel. This range of travel may allow the dolly to clamp differently sized ULDs. If the fingers travel within a predetermined range and the current draw of the motor(s) is within the threshold range of the current draw, the fingers may be determined to have successfully clamped the ULD. However, if the fingers travel the predetermined range and the current draw of the motors is outside the threshold range of the current draw, the fingers may be determined to have unsuccessfully clamped the ULD. For example, if the fingers travel the predetermined range without engaging the ULD, the resistance applied by the motor(s) may be less than the threshold range. Here, because the sensor(s) sense that the motor(s) are not drawing sufficient current, the fingers may be determined to have unsuccessfully clamped the ULD (e.g., a dolly may not be loaded, finger(s) may have passed beneath the ULD, etc.). Likewise, during unclamping, the sensor(s) may measure the travel distance of the fingers and/or the current draw on the motors to determine whether the fingers have been successfully unclamped from the ULD. Sensor(s) may respectively measure the travel distance of the first finger(s) and the second finger(s) for determining whether the first finger(s) or the second finger(s) have successfully or unsuccessfully clamped or unclamped from the ULD, respectively.

In response to determining that the ULD has been successfully clamped, the lighting elements may illuminate to the third color (e.g., green). The lighting elements may also illuminate green following a successful unclamp of the ULD, indicating that the ULD may be unloaded. Alternatively, as a result of an unsuccessful clamp or unclamp, the lighting elements may illuminate to a fourth color (e.g., red). Following an unsuccessful clamp or unclamp, the first button or the third button, for example, may be pressed again to move either the first fingers or the second fingers to either the unclamped position or the clamped position, respectively, in order to reattempt to clamp or unclamp the ULD. Moreover, sensor data generated by the sensor(s) may be continuously received when the ULD is loaded, for example, during transport, to determine whether the ULD remains clamped. For example, during transport, if the ULD becomes loose and the fingers are not successfully clamping the ULD (e.g., current draw less than the threshold amount), the lighting element may illuminate to the fourth color (e.g., red). In some instances, in response to the ULD becoming loose, the braking mechanism may be engaged to stop movement of the dolly.

In some instances, given that the first fingers and the second fingers are located on opposing sides of the dolly, and are operated by separate motors and buttons, the sensor(s) may be used to determine whether the first fingers or the second fingers have successfully or unsuccessfully clamped/unclamped the ULD. Additionally, the sensor(s) may be arranged to monitor the individual fingers of the first fingers and the second fingers, respectively, to determine the respective travel distance. The sensor(s) are also arranged to monitor the respective current draw of the first motor and the second motor for determining whether the first fingers and the second fingers have successfully or unsuccessfully clamped/unclamped the ULD, respectively.

In some instances, the sensor(s) may also include proximity sensor(s), pressure sensor(s), weight sensor(s), etc. for knowing whether a ULD is loaded on the dolly. The proximity sensor(s), or sensor data generated therefrom, may be used to control an operation of the fingers. For example, if the first button or the third button is pressed to clamp the ULD, the proximity sensor(s) may determine whether a ULD is loaded on the dolly. If no ULD is loaded, the lighting elements may illuminate to the fourth color (e.g., red), signifying that the fingers cannot clamp the ULD given that no ULD is loaded onto the dolly. In some instances, the proximity sensor(s) may also be used to determine whether the ULD is being loaded from the first side or the second side. For example, if the proximity sensor(s) indicate that the ULD is loaded onto the first side of the dolly, the second fingers along the second side may move to the clamped position to provide a bulkhead for the ULD during loading. This may, for example, prevent the ULD being slid off the second side of the dolly.

However, in some instances, only one of the first finger(s) or the second finger(s) may be in the unclamped position at a given time. This may, for example, prevent the ULD sliding off the dolly. For example, if the first button is pressed to move the first fingers to the unclamped position (e.g., so as to unload the ULD from the first side of the dolly), the second fingers may remain in the clamped position even after the ULD is unloaded. If another ULD is loaded onto the first side, the second finger(s) provide the bulkhead against which the ULD may come into contact with during loading. Alternatively, if the other ULD is to be loaded onto the second side, the first finger(s) may be moved to the clamped position (although not engaging with the ULD), and thereafter, the second finger(s) may be moved to the unclamped position.

In some instances, multiple dollies may be coupled end to end and towed by the tractor. For example, the dolly may include a first end and a second end spaced apart from the first end. The first end may include a tongue configured to pull the dolly, while the second end may include a hitch that is configured to couple to a tongue of another dolly. For example, the tongue of a first dolly may couple to a tractor (e.g., a hitch of the tractor), and the tongue of a second dolly may couple to the hitch of the first dolly. Any number of dollies may be coupled end to end for being pulled by the tractor. In some instances, the tractor may include an interface that indicates an operation state of the dollies, respectively. For example, the interface may indicate whether the fingers of the dollies are clamped to the ULD, or whether the fingers are unclamped from the ULD. The interface may therefore be used by personnel to visually identify potential safety concerns, such as when the ULD is at risk of falling off one of the dollies.

The dolly may be configured to receive different sized and/or types of ULDs. For example, given the moveable nature of the clamping mechanism(s), differently sized ULDs may be placed on the loading surface, and thereafter, the clamping mechanism(s) may move into position to secure the ULD to the dolly. In some instances, at least two fingers on each side of the dolly may engage with the ULD. Further, although the above discussion is within regard to a single ULD being received by the dolly, multiple ULDs may be secured to the dolly at a single instance. Additionally, although the discussion herein relates to the dolly receiving ULDs, the dolly may be configured to receive other containers, bins, totes, and so forth. Still, although the discussion herein relates to using the dolly within aircraft environments, the ULDs may find use in applications other than aircraft, such as trains, trucking, ships, and so forth.

Although the clamping mechanisms are described as being controlled via the motor(s), in some instances, the clamping mechanisms may be manually controlled without the use of the motors. For example, levers, ratchets, or other mechanisms may be actuated via personnel to move the clamping mechanisms between the unclamped position and the unclamped position. For example, in the event that batteries powering the motor(s) become non-operational (e.g., low charge, broken, etc.), the ratchets, levers, and/or other mechanisms may be used clamp and unclamp the ULD to the dolly.

Accordingly, the dolly described herein may safely and securely clamp the ULD during transport. The clamping mechanism(s) of the dolly, such as the fingers, may automatically lock the ULD to the dolly following a press of buttons. For example, in response to a press of a button, the fingers may move to a position to clamp the ULD to the dolly. During this process, the dolly may determine whether the ULD has been successfully or unsuccessfully clamped to the dolly. That is, by measuring a distance of travel of the fingers, or a resistance applied to the motor(s) moving the fingers, the dolly may include components (e.g., controller(s)) that determine whether the ULD has been successfully clamped. In such instances, lighting elements may illuminate to indicate that the ULD may be transported.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example dolly 100 usable to transport a ULD 102, according to examples of the present disclosure. The ULD 102 is shown being loaded onto the dolly 100, and in such instances, the dolly 100 is configured to transport the ULD 102. For example, once loaded, a tractor may tow the dolly 100 or a personnel may move the dolly 100 for transferring the ULD 102 between locations within an environment or between environments. Once transferred, the ULD 102 may be unloaded from the dolly 100.

The dolly 100 may include a first end 104 and a second end 106 spaced apart from the first end 104 (e.g., in the Z-direction), as well as a first side 108 and a second side 110 spaced apart from the first side 108 (e.g., in the X-direction). As shown, the ULD 102 may reside on the dolly 100 at a location between the first end 104, the second end 106, the first side 108, and the second side 110. In some instances, and as will be explained herein, the ULD 102 may reside on a deck 112 of the dolly 100. The deck 112 may represent a rolling surface made up of wheels, rollers, etc. such that the ULD 102 may be movable on the dolly 100 in order to load and unload the ULD 102 to and from the dolly 100, respectively.

The dolly 100 includes clamping mechanism(s) 114 that secure the ULD 102 to the dolly 100. The clamping mechanism(s) 114 are movable between an unclamped position and a clamped position. In the unclamped position, the clamping mechanism(s) 114 may not be engaged with the ULD 102, for example, in order to load the ULD 102 onto the dolly 100 or to unload the ULD 102 from the dolly 100. In the clamped position, the clamping mechanism(s) 114 may engage with the ULD 102. For example, once the ULD 102 is loaded onto the dolly 100, the clamping mechanism(s) 114 may be actuated to the clamped position in order to secure the ULD 102 on the dolly 100. In FIG. 1, the clamping mechanism(s) 114 are shown in the clamped position.

In some instances, the clamping mechanism(s) 114 include or represent finger(s) 116 (e.g., hooks, grippers, etc.) that engage with the ULD 102. In the unclamped position, the finger(s) 116 may reside vertically beneath the deck 112 (e.g., in the Y-direction), and in the clamped position, the finger(s) 116 may reside above or on the deck 112 in order to engage with the ULD 102. In some instances, the finger(s) 116 may include first fingers disposed at, along, or proximate to the first side 108 for engaging with a first side of the ULD 102, and second fingers disposed at, along, or proximate to the second side 110 for engaging with a second side of the ULD 102 (e.g., spaced apart in the X-direction). In some instances, the first finger(s) and/or the second finger(s) may include four fingers, respectively. As such, the finger(s) 116 may be used secure the ULD 102 along multiple sides.

The ULD 102 may represent a container having an internal volume, cavity, etc. within which goods, items, packages, and the like are placed. In some instances, the ULD 102 may be shaped and sized to fit within an aircraft. The ULD 102 may include a bottom 118 and a top 120 spaced apart from the bottom 118 (e.g., in the Y-direction). When loaded onto the dolly 100, the bottom 118 may reside or rest on the deck 112. The bottom 118 may include a flange, projection, or lip 122 that is engageable by the finger(s) 116 of the clamping mechanism(s) 114. The lip 122 may include any shape, channel, or groove that is engageable by the finger(s) 116. The finger(s) 116 may be configured to reside at least partially over the lip 122 for retaining the ULD 102. In some instances, the lip 122 may extend around an entirety of a perimeter at the bottom 118, or may extend around less than an entirety of the perimeter at the bottom 118. For example, the lip 122 may only extend around certain sides of the ULD 102.

Although a particular size or shape of the ULD 102 is shown, the dolly 100 may receive differently sized and/or shaped ULDs. For example, the dolly 100 may receive a smaller ULD with a similar or different shape. In such instances, the finger(s) 116 are configured to clamp onto the lip 122 given that the finger(s) 116 may be translated over a certain range of travel between the unclamped position and the clamped position.

The finger(s) 116 may be moveable between the clamped position in which the finger(s) 116 are engaged with the ULD 102 and the unclamped position in which the finger(s) 116 are disengaged with the ULD 102 via motor(s) 124. In some instances, the motor(s) 124 may include a first motor that moves the first finger(s) and a second motor that moves the second finger(s). In some instances, the motor(s) 124 may be independently actuatable such that the first finger(s) and the second finger(s) operate independently. That is, the first motor may be actuated to move the first finger(s) between the unclamped position and the clamped position, while the second motor may be actuated to move the second finger(s) between the unclamped position and the clamped position.

In some instances, the motor(s) 124 operably couple to the finger(s) 116 via shafts, chains, and/or sprockets. For example, the finger(s) 116 may be disposed on chains and the sprockets may be disposed about a shaft coupled to the motor(s) 124. Actuation of the motor(s) 124 may rotate the shaft, and correspondingly, the sprockets may rotate to move the chain. Given the coupling of the finger(s) 116 to the chains, actuation of the motor(s) 124 may move the finger(s) 116 between the unclamped position and the clamped position. For example, the motor(s) 124 may be actuated in a first direction to move the finger(s) 116 from the unclamped position to the clamped position, and in a second direction to move the finger(s) 116 from the clamped position to the unclamped position. Additionally, as the finger(s) 116 may include first finger(s) disposed along the first side 108, and second finger(s) 116 disposed along the second side 110, actuation of the first motor and the second motor may correspondingly rotate respective shafts that are used to drive chains coupled to the respective finger(s) 116. In some instances, individual finger(s) are coupled to individual chains, and individual chains may be engaged by two sprockets, where a first sprocket couples to the shaft engaged with the motor(s) 124, respectively, and a second sprocket around which an opposite end of the chain rotates.

The dolly 100 also includes button(s) 126 (e.g., switches, levers, input mechanisms, etc.), sensor(s) 128, and/or lighting element(s) 130. The button(s) 126, as discussed herein, may be used to at least partially control an operation of the clamping mechanism(s) 114, for example, to clamp and unclamp the ULD 102. For example, the button(s) 126 may include button(s) 126 associated with unclamping and clamping the ULD 102 to the dolly 100, as well as emergency buttons that control a braking mechanism 132 of the dolly 100. The button(s) 126 may respectively control an operation of the first fingers and the second fingers. For example, one button may control the first finger(s) between the clamped position and the unclamped position, while a second button may control the second finger(s) between the clamped position and the unclamped position.

The sensor(s) 128 may determine a state of the clamping mechanism(s) 114, for example, whether the ULD 102 was successfully clamped or unclamped, as well as whether the ULD 102 was unsuccessfully clamped or unclamped. In some instances, the sensor(s) 128 may measure a resistance, pressure, or draw of the motor(s) 124 for determining whether the finger(s) 116 have successfully clamped the ULD 102. The sensor(s) 128 may also determine a travel distance of the finger(s) 116, the chains, or an amount of movement associated with the motor(s) 124 for determining whether the ULD 102 has been successfully or unsuccess-fully clamped and unclamped. Meanwhile, the lighting element(s) 130 may provide visual indications as to whether the ULD 102 was successfully clamped or unclamped, and whether the ULD 102 was unsuccessfully clamped or unclamped, and/or current operations being performed by the ULD 102. More generally, however, the lighting element(s) 130 may illuminate according to operations being performed by the dolly 100, or an operational state of the clamping mechanism(s) 114.

The dolly 100 is shown including processor(s) 134 and memory 136, where the processor(s) 134 may perform various functions and operations associated controlling the clamping mechanism(s) 114, and the memory 136 may store instructions executable by the processor(s) 134 to perform the operations described herein. For example, in response to a press of the button(s) 126 to clamp the ULD 102 to the dolly 100, the processor(s) 134 may cause the clamping mechanism(s) 114 to move from the unclamped position to the clamped position (in instances in which the clamping mechanism(s) 114 are in the unclamped position). In some instances, following a press of the button(s) 126, the lighting element(s) 130 may illuminate the button(s) 126 (or a button that was pressed) to a first color (e.g., yellow). Upon the clamping mechanism(s) 114 retracting to the unclamped position, the lighting element(s) 130 may illuminate the button(s) 126 to a second color (e.g., orange) for a threshold amount of time to indicate that the ULD 102 may be unloaded from the dolly 100, or that the clamping mechanism(s) 114 have moved to the unclamped position. Further, after the threshold amount of time, the lighting element(s) 130 may illuminate the button(s) 126 to a third color (e.g., green) to indicate that the clamping mechanism(s) 114 are unclamped.

In some instances, sensor data 138 generated by the sensor(s) 128 may be used to determine whether the clamping mechanism(s) 114 were successfully unclamped. For example, the memory 136 is shown having access to or storing threshold data 140, where the threshold data 140 may indicate a predetermined amount of travel of the clamping mechanism(s) 114 between the unclamped state and the clamped state, as well as an amount of current drawn by the motor(s) 124. For example, given that the dolly 100 has a certain width (e.g., between the first side 108 and the second side 110), the clamping mechanism(s) 114 (or the finger(s) 116) have a certain amount of travel in order to engage with the ULD 102. The amounts of travel, however, may be dependent upon the size of the ULD 102. For example, for a larger ULD, the finger(s) 116 may travel a lesser distance in order to engage with the ULD 102 as compared to a small ULD in which the finger(s) 116 may travel a greater distance in order to engage with the ULD 102. Accordingly, knowing the amount of travel that the finger(s) 116 may move to engage with the ULD 102 allows for a determination as to whether the finger(s) 116 have engaged the ULD 102. The sensor(s) 128 may include displacement sensor(s) that measure a distance traveled by the chain, a rotational distance of the sprockets, and so forth.

Further, when successfully clamped, the motor(s) 124 may apply a certain amount of pressure to the ULD 102. That is, in order to clamp the ULD 102, the motor(s) 124 may draw a certain amount of current. In some instances, the threshold data 140 indicates the amount of pressure, force, resistance, or draw in order to clamp the ULD 102 to the dolly 100. If the motor(s) 124 are not applying the threshold amount of pressure, for example, the ULD 102 may not be successfully clamped. Alternatively, if the motor(s) 124 are applying the threshold amount of pressure, or an amount of pressure that is within an acceptable range, the ULD 102 may be successfully clamped to the dolly 100. Still, if one of the finger(s) 116 becomes jammed, an increased load (e.g., current) may be applied to the motor(s) 124. The sensor(s) 128 may monitor the current drawn by the motor(s) to determine whether the finger(s) 116 have become jammed, and in such instances, the sensor data 138 may indicate an increased current being drawn by the motor(s) 124 to move the finger(s) 116 from the clamped position to the unclamped position, vice versa. The sensor(s) 128 may include force sensor(s), current sensor(s), voltage sensor(s), etc. that measure an amount of current, resistance, or power drawn by the motor(s) 124.

In some instances, the sensor data 138 and the threshold data 140 may be compared to determine whether the finger(s) 116 have traveled their respective distances from the clamped state to the unclamped state. For example, if the finger(s) 116 are able to move the amount of travel without experiencing a current(s) that is greater than a predetermined threshold, the clamping mechanism(s) 114 may have successfully unclamped the ULD 102. However, if the finger(s) 116 are unable to move the amount of travel and/or experience a current(s) that is greater than a predetermined threshold, the clamping mechanism(s) 114 may have unsuccessfully unclamped the ULD 102. In response, the lighting element(s) 130 may illuminate to a fourth color (e.g., red).

The sensor data 138 is continuously generated by the sensor(s) 128 for use in determining whether the ULD 102 is secured during transport. For example, during transport, if the ULD 102 becomes loose and the finger(s) 116 are not clamping the ULD 102, the lighting element(s) 130 may illuminate to the fourth color (e.g., red). In some instances, in response to the ULD 102 becoming loose, the braking mechanism 132 may be engaged to stop movement of the dolly 100. In some instances, knowing whether the ULD 102 becomes loose, or whether the finger(s) 116 are failing to successfully clamp the ULD 102, may be based on a current draw of the motor(s) 124 and/or whether the finger(s) 116 are moving during a motion of the dolly 100. If the finger(s) 116 are not successfully clamping the ULD 102, the lighting element(s) 130 may illuminate to the fourth color and/or the braking mechanism 132 may be applied.

In some instances, the sensor(s) 128 may also include proximity sensor(s), weight sensor(s), or other types of sensor(s) for knowing whether the ULD 102 is loaded or is being loaded/unloaded from the dolly 100. For example, weight sensor(s) may generate sensor data 138 that is used to determine whether the ULD 102 is loaded on the dolly 100. The sensor data 138 may also be used to indicate a directional loading/unloading of the ULD 102 on or from the dolly 100, such as whether the ULD 102 is being loaded onto the dolly 100 from the first side 108. Depending upon the directional loading, for example, certain finger(s) 116 may be actuated. For example, if the ULD 102 is being loaded onto the dolly 100 from the first side 108, the finger(s) 116 along the second side 110 may move from the unclamped state to the clamped state to prevent the ULD rolling off the dolly 100. The finger(s) 116 along the second side 110 may provide a bulkhead (e.g., backstop) for the ULD 102 when being loaded.

The dolly 100 may, in some instances, include a control panel 142 located at the first end 104. The control panel 142, as will be discussed herein with regard to FIGS. 10A and 10B, may include button(s) that configure the dolly 100 between a manual operation mode and a semi-autonomous operation mode. For example, during manual operation, a personnel may have to manually press button(s) on the control panel 142 to move the clamping mechanism(s) 114 to the unclamped position and the clamped position. The control panel 142 may include button(s) for controlling the first finger(s) on the first side 108, and button(s) for controlling the second finger(s) on the second side 110. During semi-autonomous operation, the clamping mechanism(s) 114 may operate autonomously following a press of the button(s) 126, as described above. The control panel 142 may also include lighting elements that output indications associated with servicing the dolly 100, whether the dolly 100 is being reset, and so forth.

The dolly 100 may also include battery(ies) 144 (e.g., Lithium-ion (Li-ion)) for powering components, such as the sensor(s) 128, motor(s) 124, etc. In some instances, the battery(ies) 144 are disposed at the first end 104, and/or located within a control box 146. In some instances, the control panel 142 is located on or mounted to the control box 146.

Although the dolly 100 is described as having a certain functionality and/or including certain components, other or additional functionalities and/or components are envisioned. For example, the dolly 100 may include additional sensor(s), such as accelerometers, for knowing when the dolly 100 is in motion or being moved. The dolly 100 may also include different clamping mechanism, such as ratchet mechanisms, for securing the ULD 102 to the deck 112. Additionally, the dolly 100 may include lifts that are capable of raising a height (e.g., a height of the deck 112 of the ground) of the dolly 100, for example, to load the ULD 102 into an aircraft.

As used herein, a processor, such as the processor(s) 134, may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 136, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 2B:
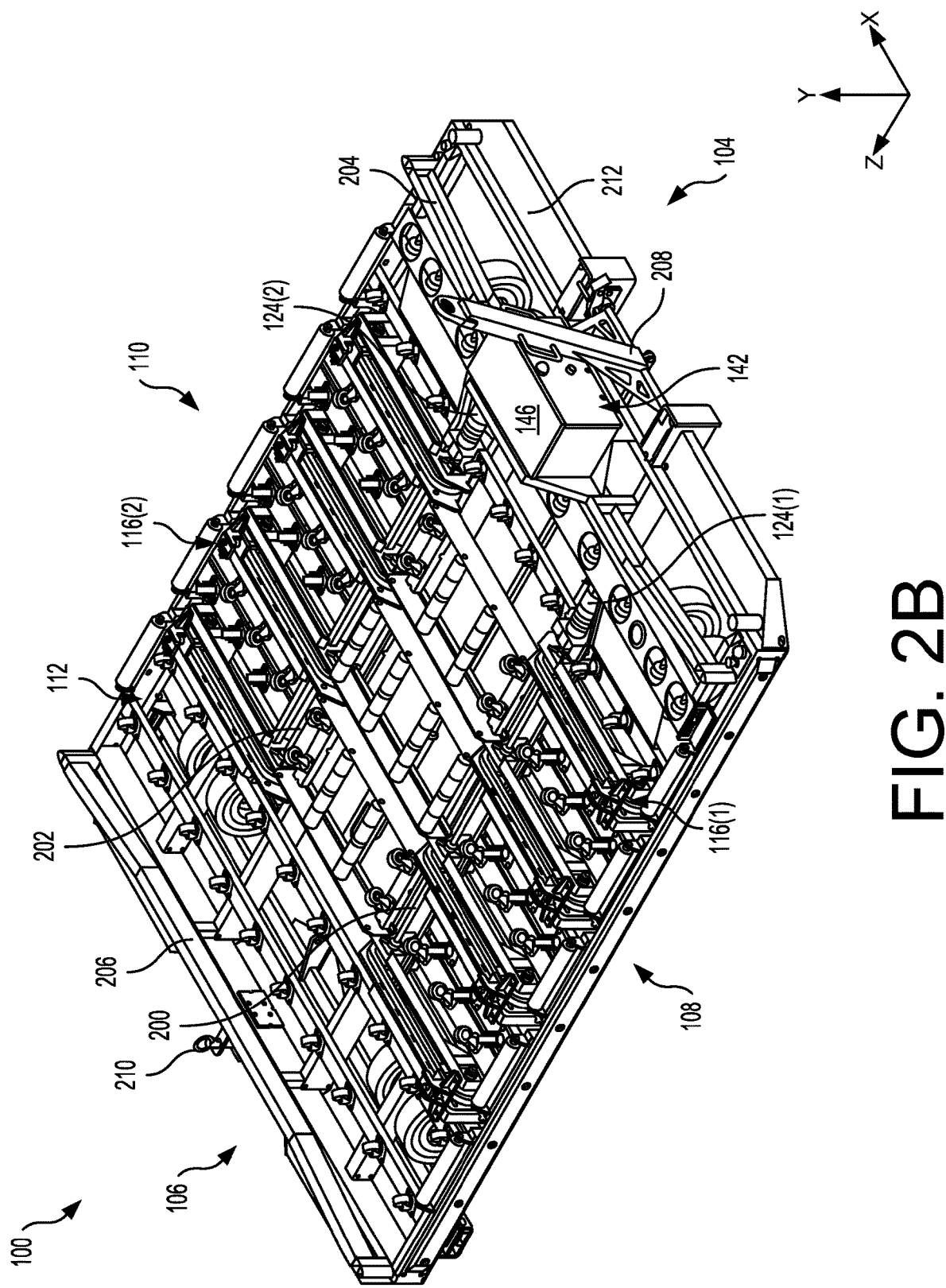
FIG. 2B illustrates a perspective view of the dolly of FIG. 1, showing the clamping mechanism(s) in a clamped state, according to an example of the present disclosure.

FIGS. 2A and 2B illustrate perspective views of the dolly 100, according to examples of the present disclosure. In FIG. 2A, the clamping mechanism(s) 114 is shown in the unclamped state, and in FIG. 2B, the clamping mechanism(s) 114 is shown in the clamped state.

The dolly 100 includes first finger(s) 116(1) located along the first side 108 and second finger(s) 116(2) located along the second side 110. In some instances, the dolly 100 includes four first finger(s) 116(1) and four second fingers 116(2). The first finger(s) 116(1) may be spaced apart from one another along the first side 108 (e.g., in the Z-direction), and the second finger(s) 116(2) may be spaced apart from one another along the second side 110 (e.g., in the Z-direction).

The first finger(s) 116(1) may operably couple to a first motor 124(1) and the second finger(s) 116(2) may operably couple to a second motor 124(2). For example, the dolly 100 may include a first shaft 200 coupled to the first motor 124(1), and a second shaft 202 coupled to the second motor 124(2). During actuation of the first motor 124(1), for example, the first shaft 200 may rotate (e.g., about the Z-axis) to move the first finger(s) 116(1) between the unclamped position and the clamped position (e.g., in the X-direction). Likewise, during actuation of the second motor 124(2), for example, the second shaft 202 may rotate (e.g., about the Z-axis) to move the second finger(s) 116(2) between the unclamped position and the clamped position (e.g., in the X-direction). As shown in FIG. 2A, in the unclamped position, the first finger(s) 116(1) and the second finger(s) 116(2) may be located vertically below the deck 112, whereas in the clamped position, as shown in FIG. 2B, the first finger(s) 116(1) and the second finger(s) 116(2) may be located vertically above the deck 112.

As will be discussed herein, the first finger(s) 116(1) may be coupled to a chain that is disposed about sprockets. One of sprockets about which the first finger(s) 116(1) are disposed is coupled to the first shaft 200 in order to move the first finger(s) 116(1) between the unclamped position and the clamped position. Similarly, the second finger(s) 116(2) may be coupled to a chain that is disposed about sprockets. One of the sprockets about which the second finger(s) 116(2) is disposed couples to the second shaft 202 in order to move the second finger(s) 116(2) between the unclamped position and the clamped position.

The dolly 100 may include a first bulkhead 204 and a second bulkhead 206. The first bulkhead 204 may be located at the first end 104, and may be disposed between the first side 108 and the second side 110 (e.g., in the X-direction). The second bulkhead 206 may be located at the second end 106, and may be disposed between the first side 108 and the second side 110 (e.g., in the X-direction). The first bulkhead 204 and the second bulkhead 206 may be located above the deck 112 of the dolly 100 in order to guide the ULD 102 onto the deck 112.

The dolly 100 may include a tongue 208 located at the first end 104 and a hitch 210 located at the second end 106. The tongue 208 may be used to connect the dolly 100 to a tractor in order to pull the dolly 100. The hitch 210 may receive a tongue of another dolly such that dollies may be connected end to end, allowing the tractor to tow multiple dollies at once.

The dolly 100 includes the control panel 142 disposed at or proximate to the first end 104. In some instances, the control panel 142 is disposed on the control box 146 that houses the battery(ies) 144 of the dolly 100, for example. The control box 146 may be located external to the first bulkhead 204, closer to the first end 104 of the dolly 100 than the first bulkhead 204.

The dolly 100 may include a frame 212 to which components of the dolly 100 couple. For example, the motor(s) 124, the control box 146, the clamping mechanism(s) 114, the first bulkhead 204, the second bulkhead 206, and so forth may couple to the frame 212. Further, the frame 212 may include various passages, openings, and so forth for accommodating the first shaft 200 and the second shaft 202. Additionally, the wheels and rollers that make up the deck 112 may be coupled to the frame 212. The frame 212, as well as other components of the dolly 100, may be manufactured from suitable materials (e.g., steel, aluminum, composites, etc.).

Figure 3:
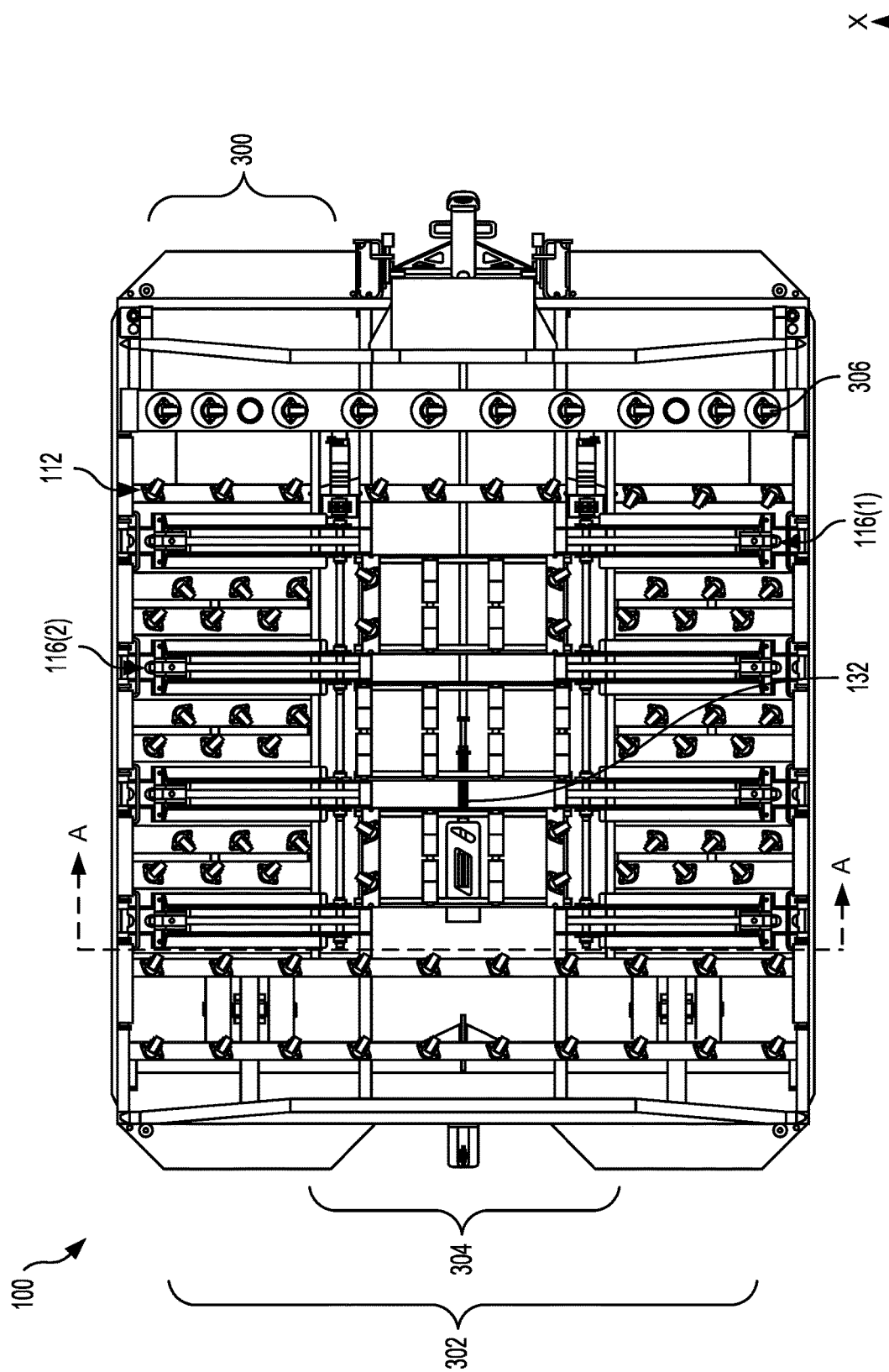
FIG. 3 illustrates a top view of the dolly of FIG. 1, according to an example of the present disclosure.

FIG. 3 illustrates a top view of the dolly 100, showing the clamping mechanism(s) 114 in the clamped state and vertically above the deck 112, according to examples of the present disclosure. The first finger(s) 116(1) and the second finger(s) 116(2) have a range of travel 300 on top of deck 112. The range of travel 300 is shown in association with the second finger(s) 116(2), however, the first finger(s) 116(1) may have a similar or different range of travel.

In FIG. 3, the first finger(s) 116(1) and the second finger(s) 116(2) are shown located at an outermost location of the range of travel 300. That is, at the position of the first finger(s) 116(1) and the second finger(s) 116(2), the first finger(s) 116(1) and the second finger(s) 116(2) may clamp onto a largest ULD that the dolly 100 is configured to receive. For example, a first distance 302 may be disposed between the first finger(s) 116(1) and the second finger(s) 116(2) at the outermost position. A second distance 304 may be disposed between the first finger(s) 116(1) and the second finger(s) 116(2) at the innermost position. As such, the dolly 100 may receive ULDs having a width (e.g., in the X-direction) between the first distance 302 and the second distance 304.

The dolly 100 also includes the braking mechanism 132. In some instances, the braking mechanism 132 is coupled to wheels of the dolly 100. In some instances, the braking mechanism 132 is controlled by the processor(s) 134 (or other controller(s)) in the control box 146. The first bulkhead 204 is located at the first end 104, and the second bulkhead 206 is located at the second end 106. The deck 112 is shown being made up of a plurality of rollers 306 (e.g., wheels, etc.) such that the ULD 102 may be easily loaded and unloaded from the dolly 100. The deck 112 may be defined between the first side 108 and the second side 110, as well as between the first end 104 and the second end 106.

Figure 4:
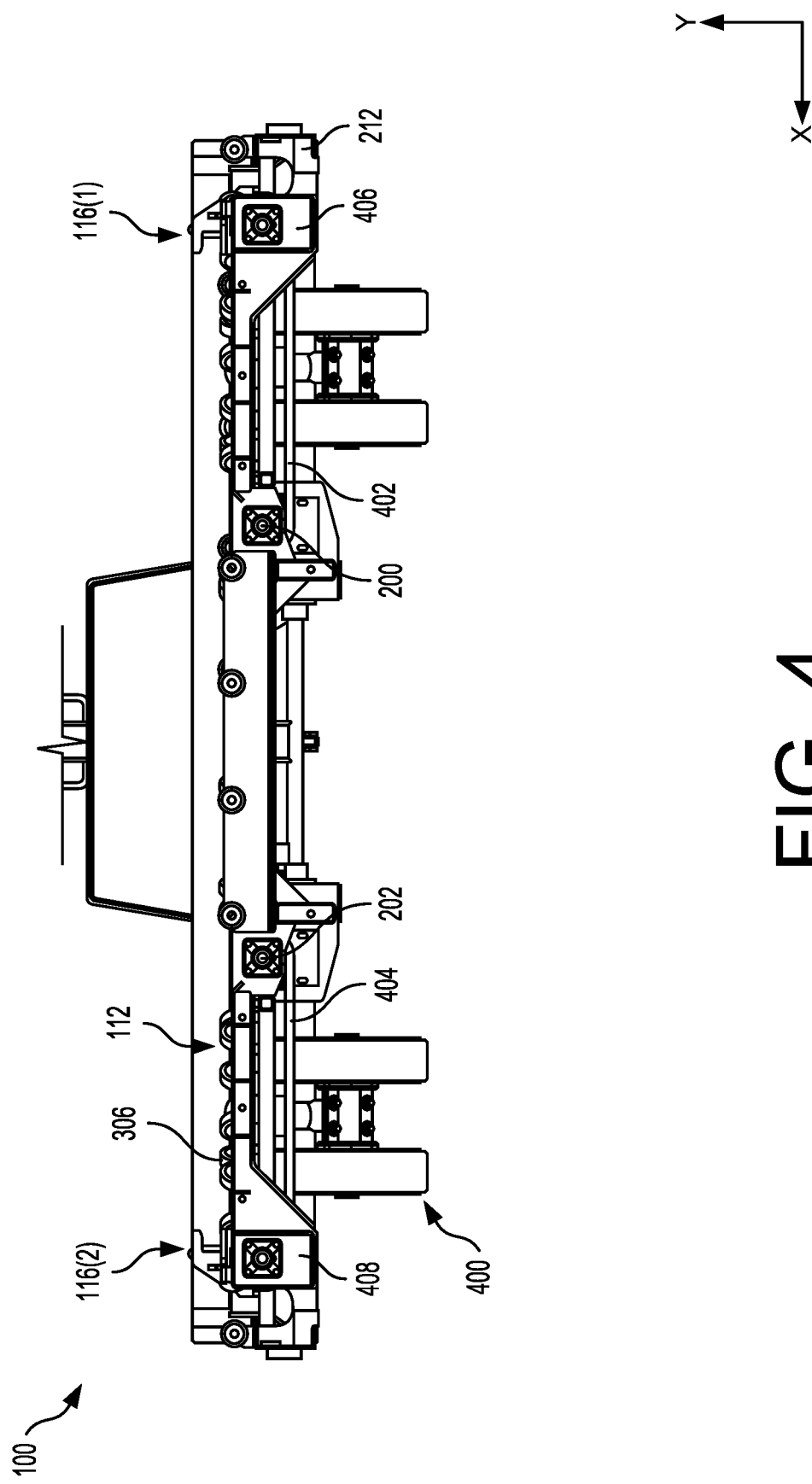
FIG. 4 illustrates an end view of the dolly of FIG. 1, taken along line A-A of FIG. 3, according to an example of the present disclosure.

FIG. 4 illustrates a sectional view of the dolly 100, taken along line A-A of FIG. 3, according to examples of the present disclosure. The dolly 100 includes wheels 400 that are coupled to the frame 212 for disposing the dolly 100 above the ground surface. The deck 112 is defined by a plurality of the rollers 306. The first shaft 200 and the second shaft 202 are disposed along a lengthwise direction of the dolly 100 (e.g., in the Z-direction). The first finger(s) 116(1) may be moveable via first chains 402. The first chains 402 may wrap around a first sprocket coupled to the first shaft 200, and a second sprocket spaced apart from the first sprocket (e.g., in the X-direction). In some instances, the first chains 402 are at least partially disposed within chain guards, such as a first chain guard 406. Similarly, the second finger(s) 116(2) may be moveable via second chains 404. The second chains 404 may wrap around a first sprocket coupled to the second shaft 202, and a second sprocket spaced apart from the first sprocket (e.g., in the X-direction). In some instances, the second chains 404 are at least partially disposed within chain guards, such as a second chain guard 408. Although discussed as chains, the dolly 100 may include belts, cables, etc. that move the first finger(s) 116(1) and the second finger(s) 116(2) between the clamped position and the unclamped position, and which engage with roller, sprockets, drums, and the like.

FIG. 5A and FIG. 5B illustrate the positioning of the finger(s) being disposed vertically below and vertically above the deck 112, respectively, according to examples of the present disclosure. For example, in FIG. 5A the first finger(s) 116(1) may be in the unclamped position, vertically below the deck 112. In the unclamped position, the ULD 102 may be loaded onto the first side 108 of the dolly 100, for example. In FIG. 5B the first finger(s) 116(1) may be in the clamped position, vertically above the deck 112. In the clamped position, the ULD 102 may be unable to be unloaded from the first side 108 of the dolly 100. As also shown, the first bulkhead 204 and the second bulkhead 206 may be located vertically above the deck 112 (and/or the rollers 306) in order to prevent the ULD 102 sliding off the first end 104 and the second end 106 of the dolly 100, respectively.

Although the discussion of FIGS. 5A and 5B is with regard to the first finger(s) 116(1), the second finger(s) 116(2) may similarly move between the unclamped position in order to be disposed vertically below the deck 112 and the clamped position to be disposed vertically above the deck 112.

Figure 6:
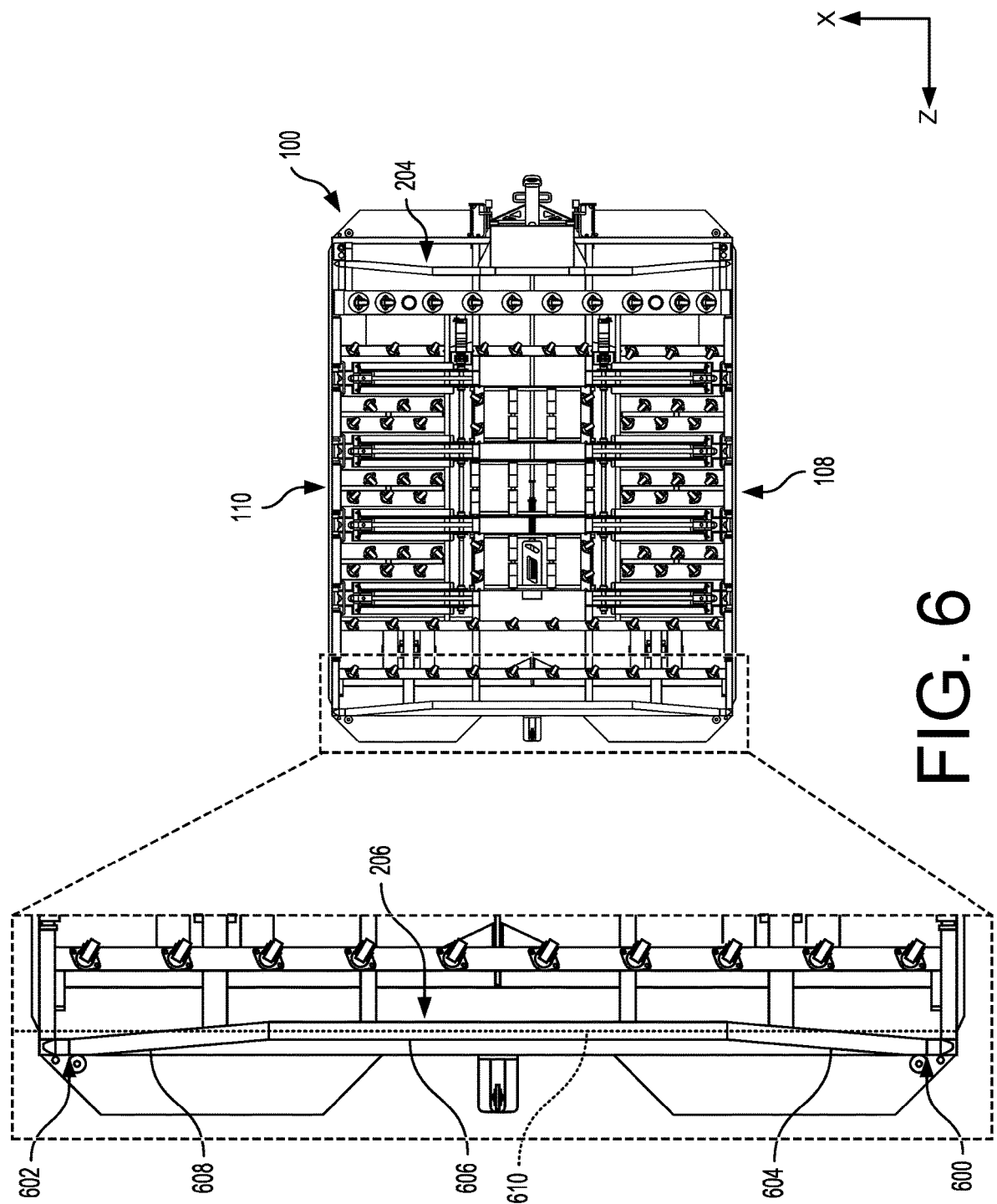
FIG. 6 illustrates a top view of the dolly of FIG. 1, showing an example bulkhead of the dolly, according to an example of the present disclosure.

FIG. 6 illustrates the second bulkhead 206 of the dolly 100, according to examples of the present disclosure. Although the discussion herein is with regard to the second bulkhead 206, the first bulkhead 204 may include similar components and/or function similarly as the second bulkhead 206.

In some instances, the second bulkhead 206 couples to the frame 212 of the dolly 100, and/or is disposed above the deck 112 of the dolly 100. The second bulkhead 206 may include a first side 600 and a second side 602 spaced apart from the first side 600. The first side 600 may be disposed adjacent to, or at, the first side 108 of the dolly 100, and the second side 602 may be disposed adjacent to, or at, the second side 110 of the dolly 100.

The second bulkhead 206 is shaped in order to assist guiding the ULD 102 onto the deck 112. For example, the second bulkhead 206 may include a first section 604, a second section 606, and a third section 608. The first section 604 may extend from the first side 600 and the third section 608 may extend from the second side 602. The second section 606 may be disposed between the first section 604 and the third section 608. To guide the ULD 102 onto the deck 112, the first section 604 and the third section 608 may be transverse to the second section 606. In such instances, if the ULD 102 is loaded onto the deck 112 from the first side 108 of the dolly 100, the first section 604 may assist in guiding the ULD 102 onto the deck 112, and if the ULD 102 is loaded onto the deck 112 from the second side 110 of the dolly 100, the third section 608 may assist in guiding the ULD 102 onto the deck 112.

In some instances, a central axis 610 is disposed through the second section 606, and the first section 604 and the third section 608 may extend transverse to the central axis. Stated alternatively, the second section 606 may be disposed at a greater distance from the second end 106 of the dolly 100 as compared to the first section 604 at the first side 600 and/or the third section 608 at the second side 602.

Figure 7A:
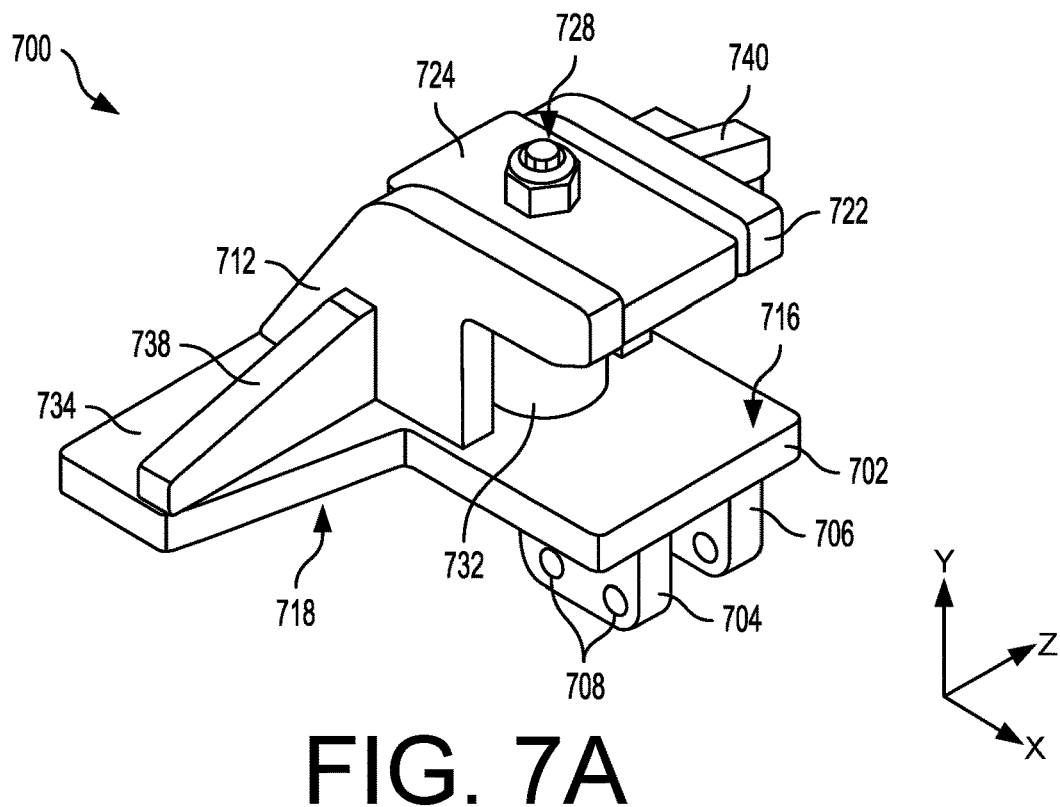
FIGS. 7A-7F illustrate an example finger of the clamping mechanism(s) of the dolly of FIG. 1, according to an example of the present disclosure.
Figure 7B:
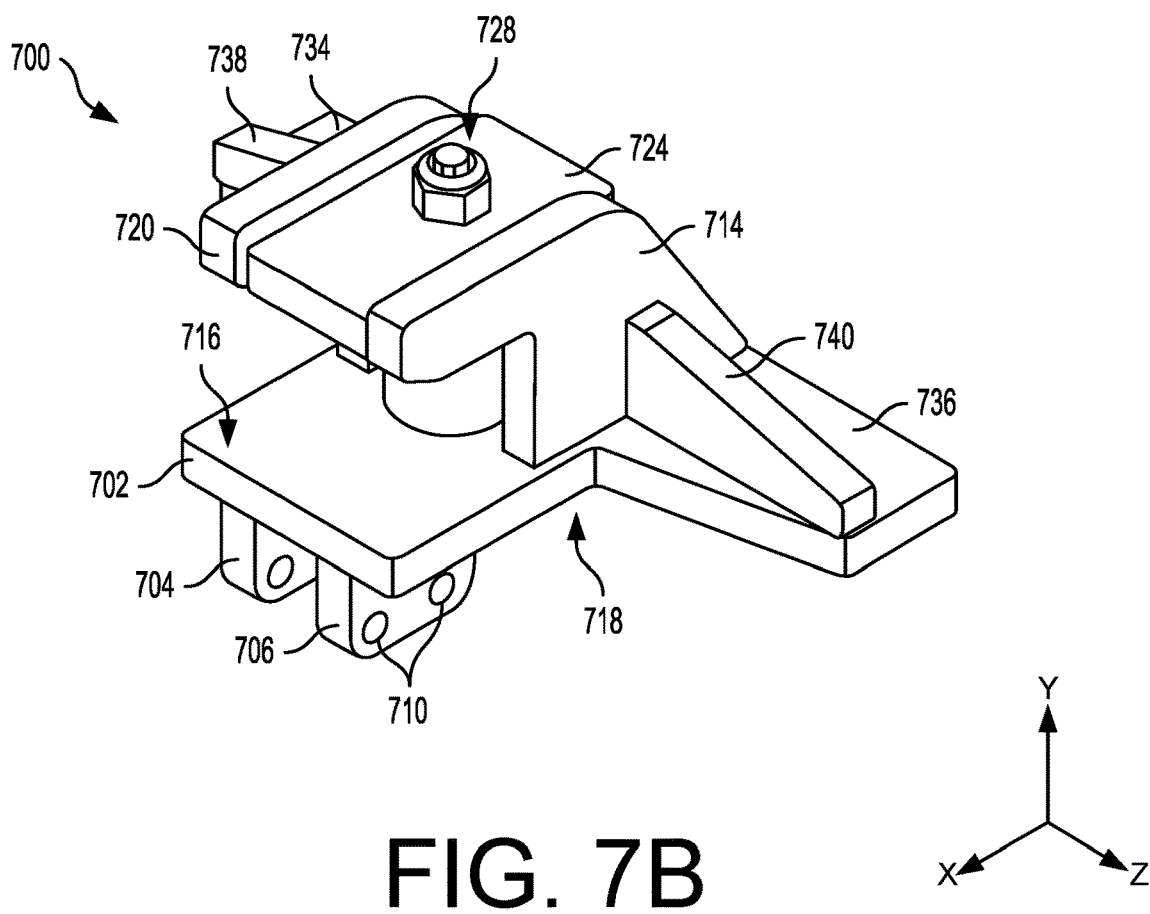
Figure 7C:
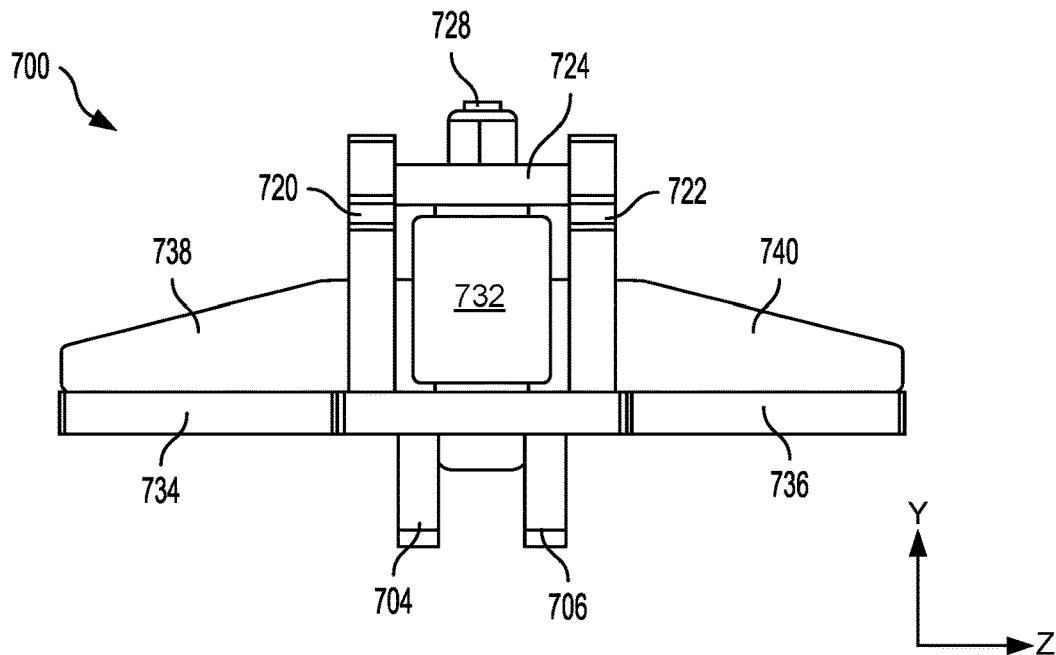
Figure 7D:
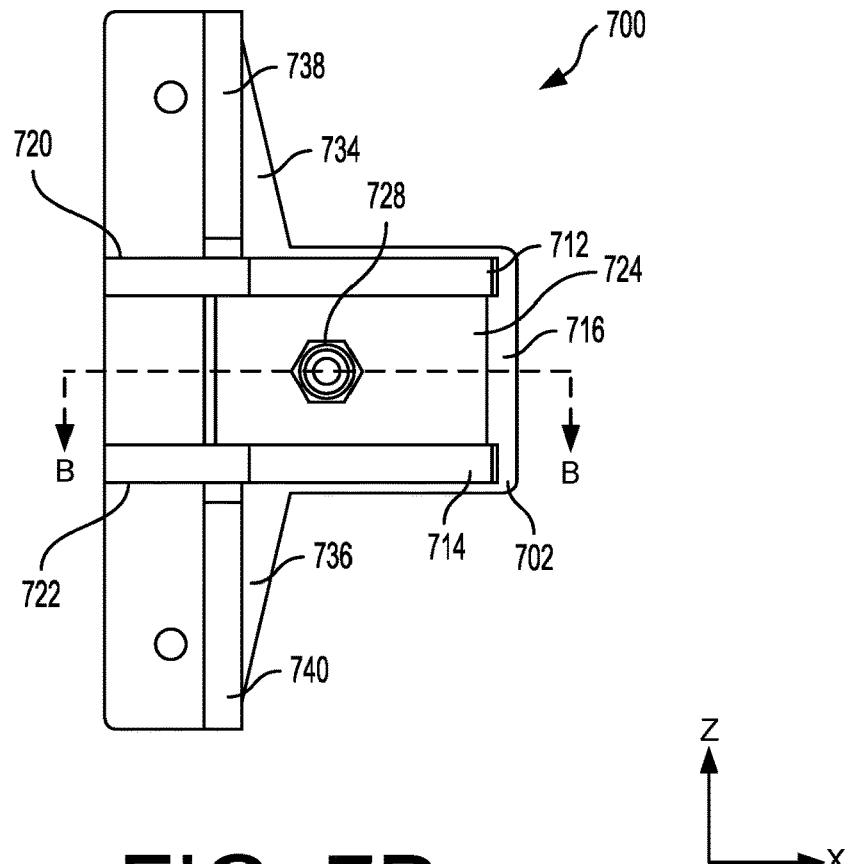
Figure 7E:
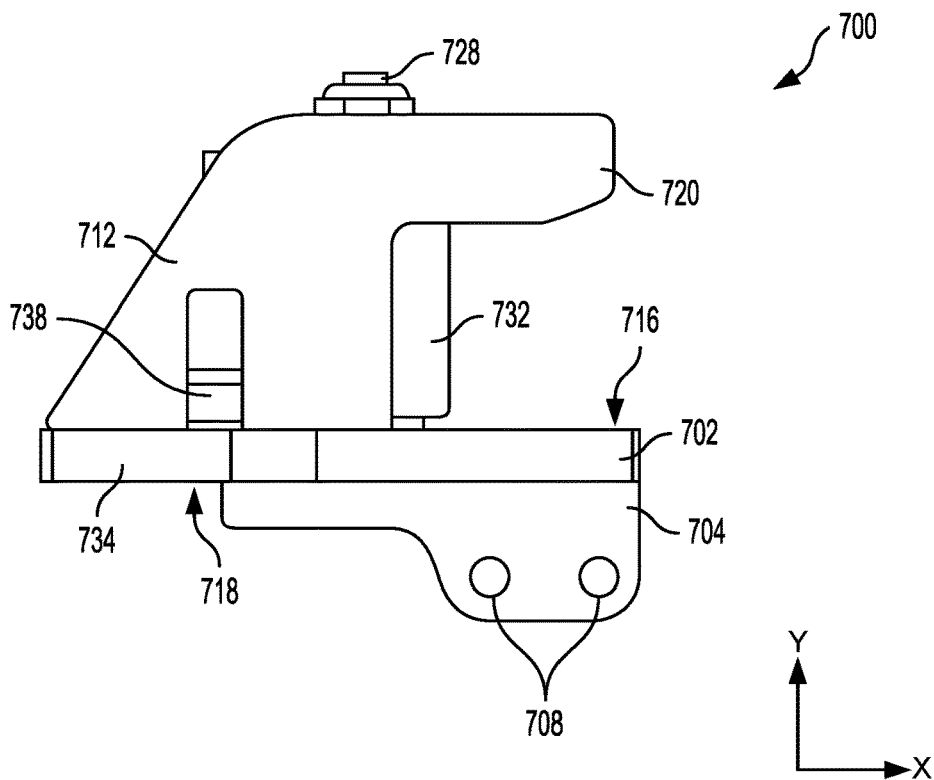
Figure 7F:
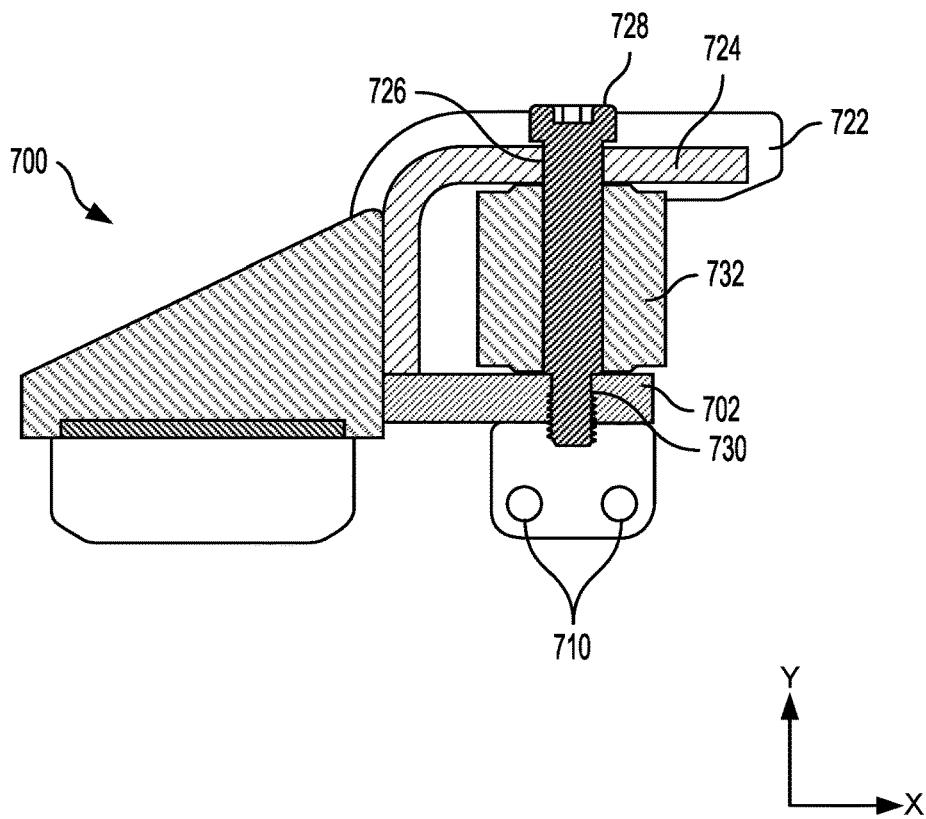

FIGS. 7A-7F various views of a finger 700, which may be representative of one of the first finger(s) 116(1) and/or the second finger(s) 116(2), according to examples of the present disclosure. FIG. 7A illustrates a perspective view of a first side of the finger 700, FIG. 7B illustrates a perspective view of a second side of the finger 700, FIG. 7C illustrates a front view of the finger 700, FIG. 7D illustrates a top view of the finger 700, FIG. 7E illustrates an end view of the finger 700, and FIG. 7F illustrates a cross-sectional view of the finger 700, taken along line B-B of FIG. 7D.

The finger 700 may include a base 702 having a first bracket 704 and a second bracket 706. The first bracket 704 and the second bracket 706 may couple the finger 700 to a chain (e.g., the first chains 402 or the second chains 404). As shown, the first bracket 704 may include first passages 708 that align with second passages 710 of the second bracket 706, respectively. In some instances, pins or other like fasteners may be disposed through the first passages 708 and the second passages 710 for coupling the finger 700 to the chain.

A first strut 712 and a second strut 714 may extend from the base 702. In some instances, the first strut 712 and the second strut 714 extend from a top surface 716 of the base 702, while the first bracket 704 and the second bracket 706 extend from a bottom surface 718 of the base 702 spaced apart from the top surface 716 (e.g., in the Y-direction). The first strut 712 may include a first flange 720 and a second flange 722 for engaging with the lip 122 of the ULD 102. For example, as shown, the first flange 720 and the second flange 722 may be disposed above the top surface 716 of the base 702. When clamped to the ULD 102, the lip 122 of the ULD 102 may reside vertically between the first flange 720 and the top surface 716, and vertically between the second flange 722 and the top surface 716.

The finger 700 also includes a plate 724 disposed between the first strut 712 and the second strut 714, and/or portions of the first flange 720 and the second flange 722. The plate 724 may include a channel 726 through which a fastener 728 is disposed. Additionally, the base 702 may include a channel 730 through which the fastener 728 is disposed. A roller 732 may be disposed about the fastener 728 and may be rotationally engaged with the fastener 728 (e.g., about the Y-axis). The roller 732 may be interposed between the plate 724 (e.g., a bottom of the plate 724) and the base 702 (e.g., the top surface 716 of the base 702). In some instances, the roller 732 permits the ULD 102 to be translated along the deck 112. For example, the lip 122 of the ULD 102 may abut or otherwise engage with the roller 732. The engagement between the lip 122 and the roller 732 may permit the ULD 102 to move across the deck 112 during a positioning of the ULD 102 (e.g., before the clamping mechanism(s) 114 clamps the ULD 102). For example, the ULD 102 may be translated in a direction between the first end 104 of the dolly 100 and the second end 106 of the dolly 100 (e.g., in the Z-direction).

The base 702, or more generally, the finger 700, may include a first wing 734 and a second wing 736 that provide structural support to the finger 700. The first wing 734 may be disposed on a first side of the base 702, while the second wing 736 may be disposed on a second side of the base 702.

Additionally, the finger 700 may include a first gusset 738 and a second gusset 740. The first gusset 738 may extend between the first wing 734 and the first strut 712, while the second gusset 740 may extend between the second wing 736 and the second strut 714. The first gusset 738 and the second gusset 740 may extend from the top surface 716 of the base 702 to the first strut 712 and the second strut 714, respectively.

In some instances, the finger 700 may find use in applications other than the dolly 100. For example, the finger 700 may be used within manually operated dollies, that is, dollies that may not have batteries to control their operation. In such instances, the finger 700 may be disposed on arms, struts, other type mechanisms for moving between a clamped state and an unclamped state. The fingers 700 may be moved via an operator maneuvering levers, pedals, hand-cranks, and so forth (e.g., non-powered mode).

Figure 8:
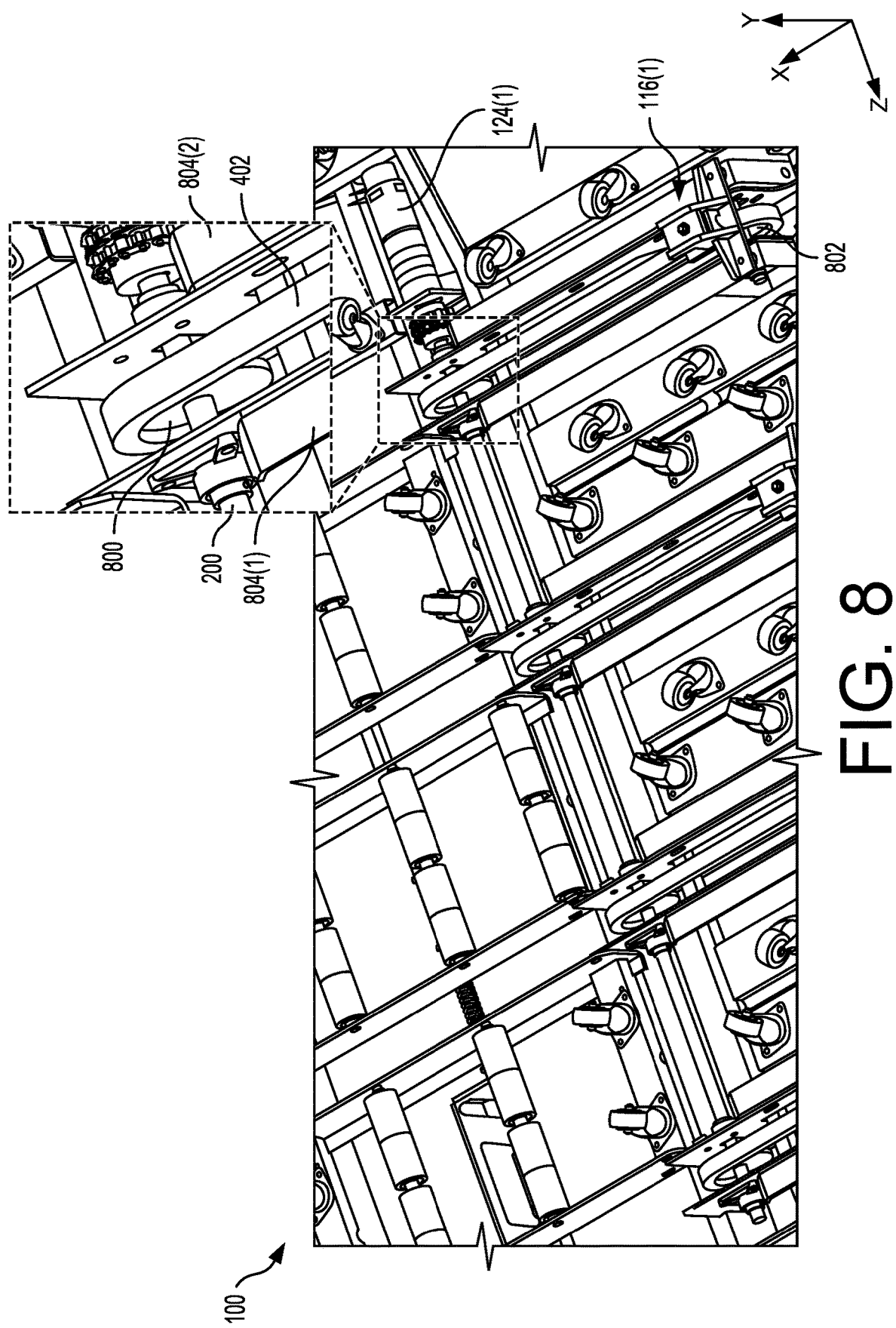
FIG. 8 illustrates the example clamping mechanism(s) of the dolly of FIG. 1, according to an example of the present disclosure.

FIG. 8 illustrates an operation of the first finger(s) 116(1), according to an example of the present disclosure. Although the discussion herein relates to the first finger(s) 116(1), the second finger(s) 116(2) may operate similarly, and the dolly 100 may include similar components as described herein to permit the operation of the second finger(s) 116(2).

The first finger(s) 116(1) may be disposed on the first chains 402. In some instances, individual first finger(s) 116(1) are disposed on individual chains of the first chains 402. That is, each of the first finger(s) 116(1) may be coupled to a single chain of the first chains 402. The first chains 402 are disposed about first sprockets 800 and second sprockets 802. The first sprockets 800 may be disposed along the length of the first shaft 200 (e.g., in the Z-direction), and the first chains 402 may be engaged (e.g., wrapped around) the first sprockets 800. For example, a first of the first sprockets 800 may be engaged with a first chain of the first chains 402, a second of the first sprockets 800 may be engaged with a second chain of the first chains 402, and so forth. The first shaft 200 is actuated by the first motor 124(1).

The second sprockets 802 are spaced apart from the first sprockets 800, in a direction towards the first side 108. In some instances, the second sprockets 802 are disposed between chain guards, such as a first chain guard 804(1) and a second chain guard 804(2). The first chain guard 804(1) and the second chain guard 804(2) may be similar to the first chain guard 406. The second sprockets 802 are rotationally coupled to the first chain guard 406(1) and the second chain guard 408(2), such that the first chains 402 may be driven around the second sprockets 802. An axle may be disposed through the second sprockets 802 to permit rotation of the second sprockets 802. As such, the first chains 402 may be engaged by one of the first sprockets 800 and one of the second sprockets 802. The first sprockets 800 may represent driver sprockets that impart movement to the first chains 402, while the second sprockets 802 may represent driven sprockets about which the first chains 402 are routed.

Actuation of the first motor 124(1) in a first direction (e.g., clockwise about the Z-axis) causes the first shaft 200 to rotate in the first direction. In doing so, the first sprockets 800 rotate in the first direction, and the first chains 402 are driven around the first sprockets 800 to translate the first finger(s) 116(1) towards the first sprockets 800, respectively. Actuation of the first motor 124(1) in a second direction (e.g., counterclockwise about the Z-axis) causes the first shaft 200 to rotate in the second direction. In doing so, the first sprockets 800 rotate in the second direction, and the first chains 402 are driven around the first sprockets 800 to translate the first finger(s) 116(1) towards the second sprockets 802, respectively.

In some instances, the first sprockets 800 and the second sprockets are the same size (e.g., diameter, same number of teeth, etc.). In some instances, the first wing 734 and the second wing 736 of the first finger(s) 116(1) translate along a top of the first chain guard 406(1) and the second chain guard 408(1). In some instances, the dolly 100 may include various bearings, bushings, and the like engaged by the first shaft 200, or an axle about which the second sprockets are disposed, respectively.

Figure 9:
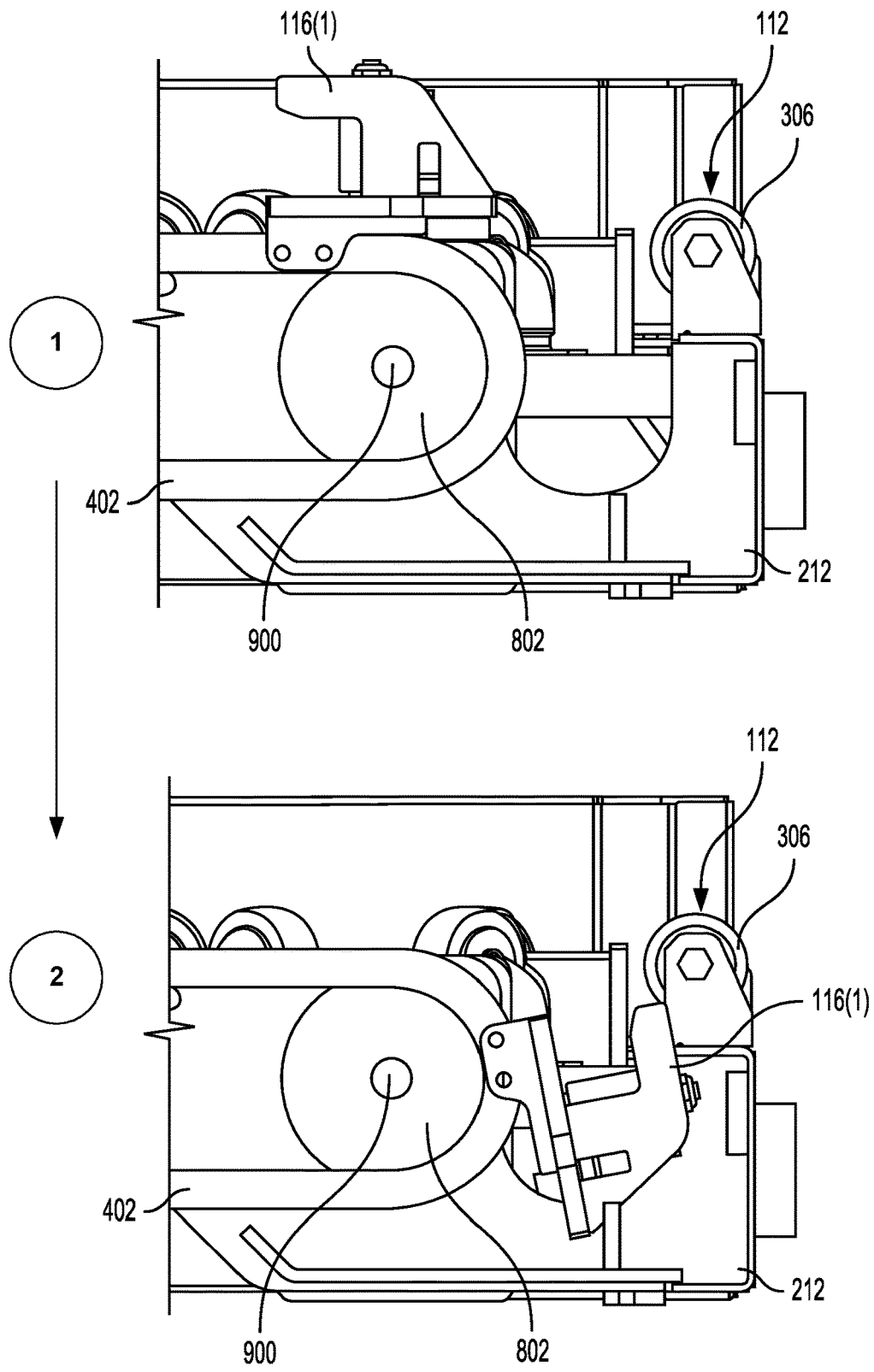
FIG. 9 illustrates an example operation of the clamping mechanism(s) of the dolly of FIG. 1, according to an example of the present disclosure.

FIG. 9 illustrates a movement of the first finger(s) 116(1), according to examples of the present disclosure. Although the discussion herein relates to the first finger(s) 116(1), the second finger(s) 116(2) may operate similarly, and the dolly 100 may include similar components as described herein to permit the operation of the second finger(s) 116(2).

The first finger 116(1) is shown coupled to the first chain 402, and the first chain 402 is shown being disposed about the second sprocket 802. The second sprocket 802 may be disposed about an axle 900. In FIG. 9 the first chain guard 804(1) is shown removed to illustrate the movement of the first finger 116(1). In the clamped position of the first finger 116(1), as shown at "1", the first finger 116(1) resides on the deck 112 (or vertically above the deck 112). In some instances, the top surface 716 of the base 702 of the first finger 116(1) is planar with a rolling surface made up by the rollers 306. In doing so, the lip 122 of the ULD 102 may be slid into the first finger 116(1). Stated alternatively, by having the top surface 716 planar with the rolling surface of the deck 112, the first finger 116(1) may be capable of engaging the lip 122 of the ULD 102.

In the unclamped position of the first finger 116(1), as shown at "2", the first finger 116(1) resides vertically below the deck 112. In some instances, the frame 212 defines a pocket within which the first finger 116(1) is disposed in the unclamped position. In some instances, the pocket is defined by the frame 212. However, importantly, the pocket provides an area for the first finger 116(1) to reside in the unclamped state in order to dispose the first finger 116(1) vertically below the deck 112 and permit the ULD 102 to be loaded or unloaded from the dolly 100.

Figure 10A:
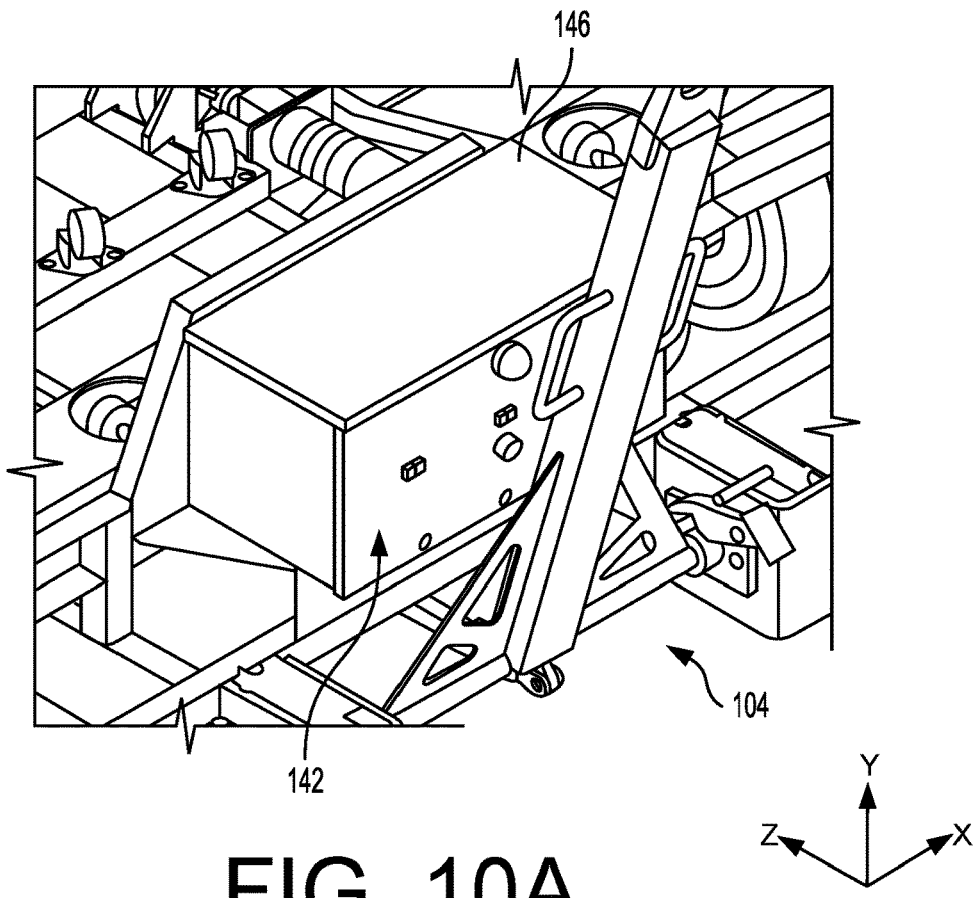
FIGS. 10A and 10B illustrate an example control panel of the dolly of FIG. 1, according to an example of the present disclosure.
Figure 10B:
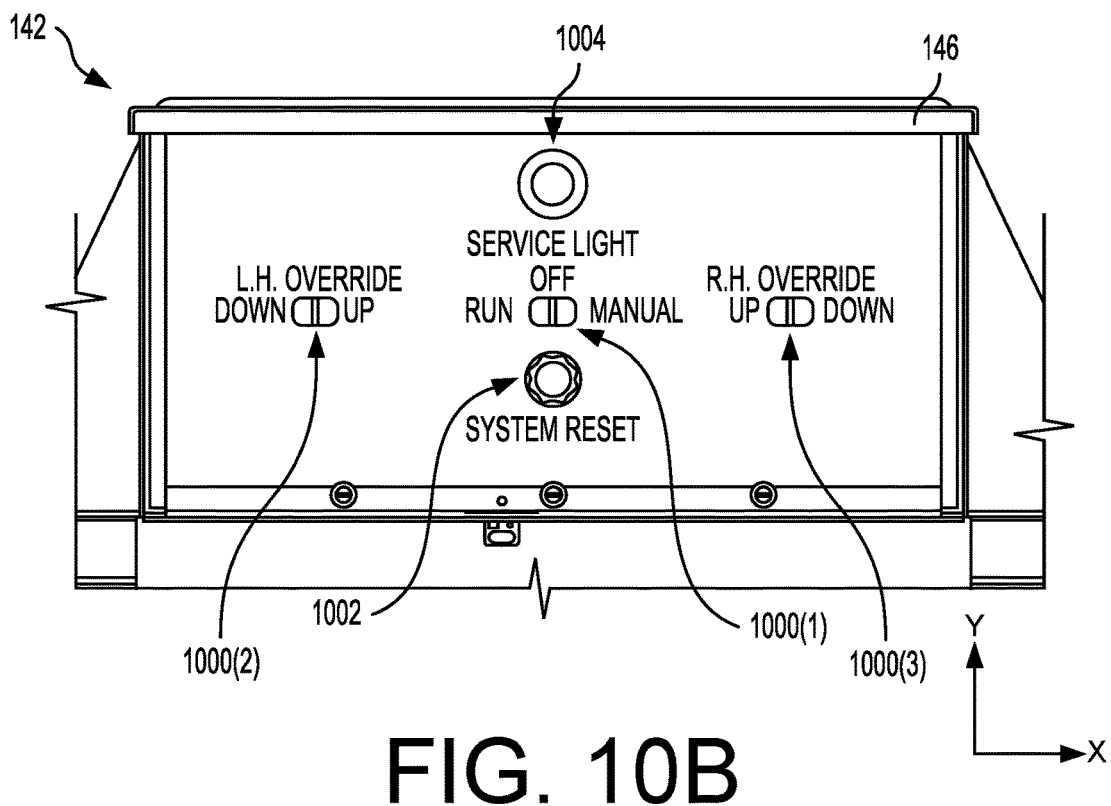

FIGS. 10A and 10B Illustrates the control panel 142, according to examples of the present disclosure. The control panel 142 is shown being located adjacent to the first end 104, proximate to the tongue 208 that may be used to tow the dolly 100. The control panel 142 may include, be coupled to, or disposed in the control box 146.

The control panel 142 may include a first switch 1000(1), a second switch 1000(2), and/or a third switch 1000(3). The first switch 1000(1), the second switch 1000(2), and the third switch 1000(3) may represent button(s) (e.g., rocker button) that are capable of being pressed by an operator of the dolly 100. In some instances, the first switch 1000(1) represents a switch to configure the dolly 100 between a manual operation mode (e.g., "manual") and a semi-autonomous operation mode (e.g., "run"). In manual operation mode, the personnel may have to manually operate the second switch 1000(2) and the third switch 1000(3) to move the clamping mechanism(s) 114 between the unclamped state and the clamped state. For example, the operator may press and hold down the second switch 1000(2) towards the "Up" indicator to move the first finger(s) 116(1) from the unclamped position to the clamped position. Similarly, the operator may press and hold down the third switch 1000(3) towards the "Up" indicator to move the second finger(s) 116(2) from the unclamped position to the clamped position. The same may be true to move the first finger(s) 116(1) and the second finger(s) 116(2) from the clamped position to the unclamped position (i.e., pressing and holding down the second switch 1000(2) and the third switch 1000(3) towards the "Down" indicator).

In the semi-autonomous operation mode (e.g., "run"), the clamping mechanism(s) 114 may operate autonomously in response to presses of the button(s) 126. For example, as described above, pressing the first button may move the first finger(s) 116(1) and/or the second finger(s) 116(2) between the unclamped position and the clamped position, and during such, the processor(s) 134 may receive the sensor data 138 to determine whether the clamping mechanism(s) 144 has successfully or unsuccessfully unclamped or clamped the ULD 102, respectively.

The control panel 142 may also include a button 1002 to reset the dolly 100. Pressing the button 1002 may cause the first finger(s) 116(1) and the second finger(s) 116 to move to the unclamped position. Each of the first switch 1000(1), the second switch 1000(2), the third switch 1000(3), and the button 1002 generate sensor data 138 that is used by the processor(s) 134, for example, to control the clamping mechanism(s) 114.

The control panel 142 may also include a lighting element 1004 that serves as a status indicator. For example, the lighting element 1004 may represent a service light that illuminates when the battery 144 of the dolly 100 needs to be recharged or replaced. In some instances, the lighting element 1004 illuminates to a first color (e.g., red) when the battery 144 needs to be recharged or replaced. Additionally, the lighting element 1004 may illuminate when the dolly 100 needs to be reset. For example, in response to a press of the second button or the fourth button, or when the sensor data 138 indicates that the ULD 102 was unsuccessfully clamped or unclamped, the lighting element 1004 may illuminate to a second color (e.g., orange)

In some instances, the control panel 142 (and the control box 146) may be located on the dolly 100 differently than shown. For example, the control panel 142 may be located proximate to the second end 108, and/or along sides of the dolly 100. Moreover, the battery 144 residing within the control box 146 may be located differently than shown, such as below the deck 112. As such, the control panel and/or the control box 146, as well as components residing therein, may be located differently than shown.

Figure 11A:
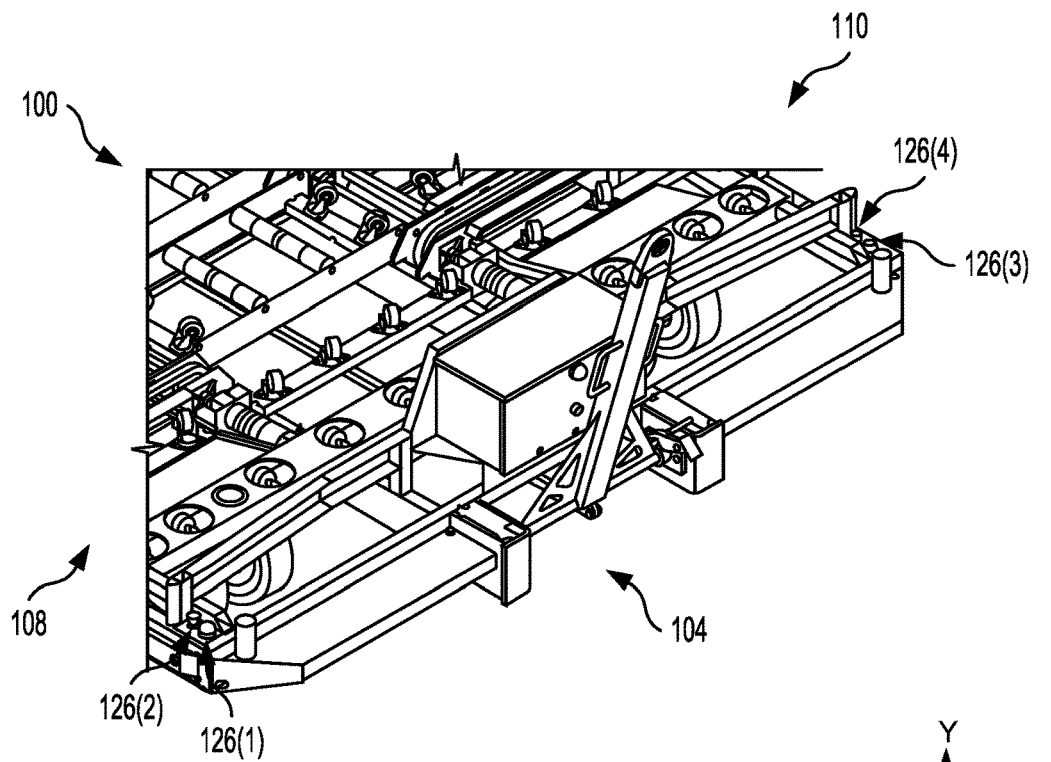
FIGS. 11A and 11B illustrate example button(s) of the dolly of FIG. 1, according to an example of the present disclosure.
Figure 11B:
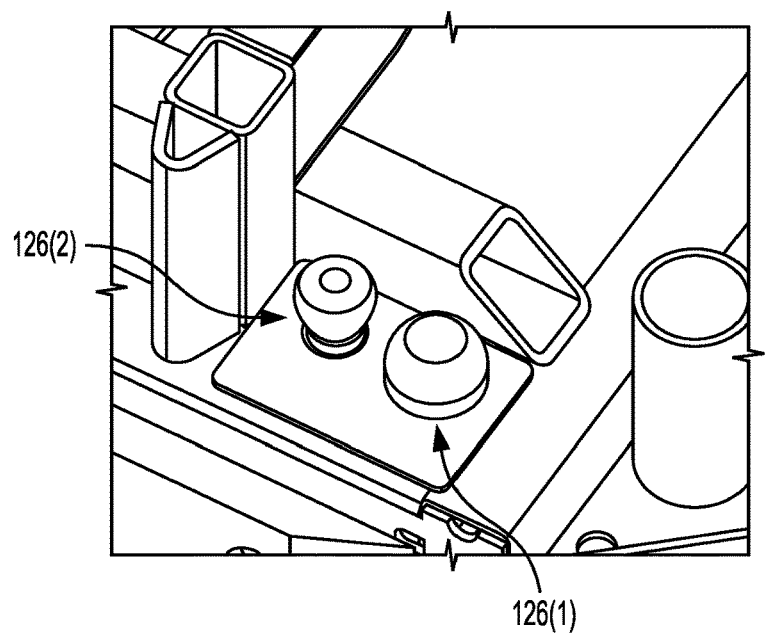

FIGS. 11A and 11B illustrate the button(s) 126 of the dolly 100, according to examples of the present disclosure. A first button 126(1) and a second button 126(2) are shown located on the first side 108, proximate to the first end 104. A third button 126(3) and a fourth button 126(4) are shown located on the second side 110, proximate to the first end 104. As shown, the first button 126(1) may be located closer to the first end 104 than the second button 126(2), and/or the third button 126(3) may be located closer to the first end 104 than the fourth button 126(4).

The first button 126(1) and the third button 126(3) may include a similar functionality. For example, the first button 126(1) and the third button 126(3) may be pressed to unclamp or clamp the first finger(s) 116(1) and the second finger(s) 116(2), respectively. As such, the first button 126(1) may control the first finger(s) 116(1) and the third button 126(3) may control the second finger(s) 116(2). In some instances, the first button 126(1) and the third button 126(3) include a clear, opaque, or translucent cover (e.g., button cover) in order to emit light from the lighting element(s) 130. For example, the first button 126(1) may have a first lighting element residing therebeneath (e.g., in the Y-direction), and the third button 126(3) may have a second lighting element residing therebeneath (e.g., in the Y-direction). The first lighting element and the second lighting element may illuminate according to the positions of the first finger(s) 116(1) or the second finger(s) 116(2), respectively, whether the first button 126(1) or the third button 126(3) were pressed, whether the ULD 102 is unclamped or clamped, and so forth.

For example, in the clamped position and when the first finger(s) 116(1) and the second finger(s) 116(2) are clamping the ULD 102, the first lighting element and the second light element may illuminate green. Following a press of the first button 126(1) or the third button 126(3), the first lighting element and the second light element may illuminate yellow, respectively. In addition, as the first finger(s) 116(1) and/or the second finger(s) 116(2) are moving to the unclamped position or the clamped position, the first lighting element and the second lighting element may illuminate orange. The first lighting element and the second lighting element may also illuminate red if the first finger(s) 116(1) or the second finger(s) 116(2) fail to successfully clamp the ULD 102, fail to unsuccessfully unclamp the ULD 102, and/or in response to the second button 126(2) or the fourth button 126(4) being pressed. The color, intensity, or pattern illuminated by the first lighting element and the second lighting element may be visible through or external to the first button 126(1) and the third button 126(3). Moreover, in some instances, the first lighting element and the second lighting element may operable independently or in unison.

The second button 126(2) and the fourth button 126(4) may correspond to emergency stop buttons. In some instances, the second button 126(2) and the fourth button 126(4) may be pulled or pushed to engage the emergency stop. In some instances, pressing the second button 126(2) and/or the fourth button 126(4) may engage emergency stop (i.e., one of the second button 126(2) or the fourth button 126(4) may be pressed to engage the emergency stop).

In some instances, the first button 126(1), the second button 126(2), the third button 126(3), and/or the fourth button 126(4) may represent mechanical-type buttons. However, in some instances, the first button 126(1), the second button 126(2), the third button 126(3), and/or the fourth button 126(4) may represent capacitive-type button(s), resistive-type buttons, etc. Additionally, although the first button 126(1), the second button 126(2), the third button 126(3), and/or the fourth button 126(4) are shown in a certain location or position, the first button 126(1), the second button 126(2), the third button 126(3), and/or the fourth button 126(4) may be arranged differently than shown. For example, the first button 126(1), the second button 126(2), the third button 126(3), and/or the fourth button 126(4) may be located more proximate to the second end 106 of the dolly 100. Moreover, the first button 126(1) and/or the second button 126(2) may not be grouped together, and/or the third button 126(3) and the fourth button 126(4) may not be grouped together.

Figure 12:
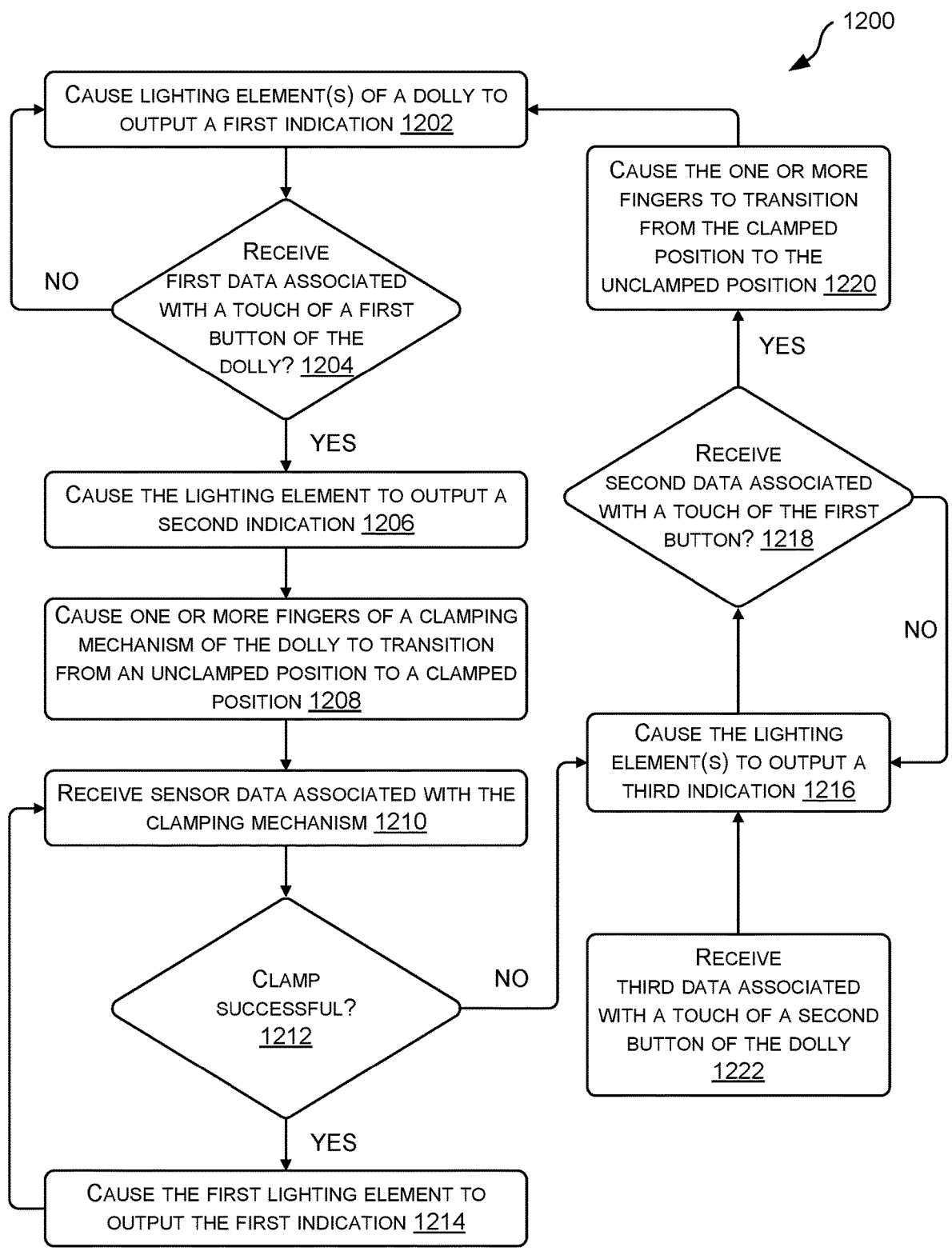
FIG. 12 illustrates an example process for controlling the clamping mechanism(s) of the dolly of FIG. 1, according to an example of the present disclosure.
Figure 13:
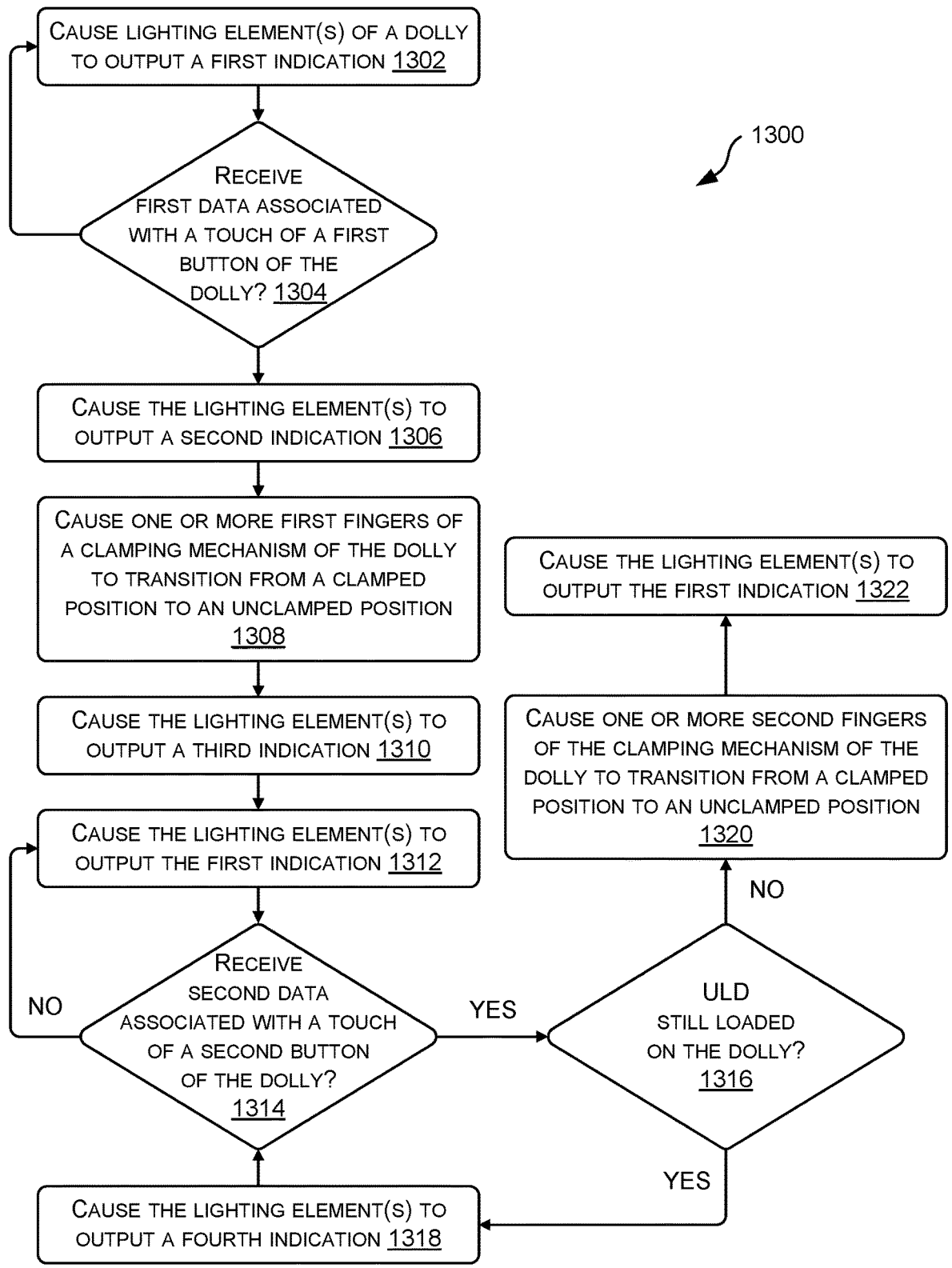
FIG. 13 illustrates an example process for controlling the clamping mechanism(s) of the dolly of FIG. 1, according to an example of the present disclosure.
Figure 14:
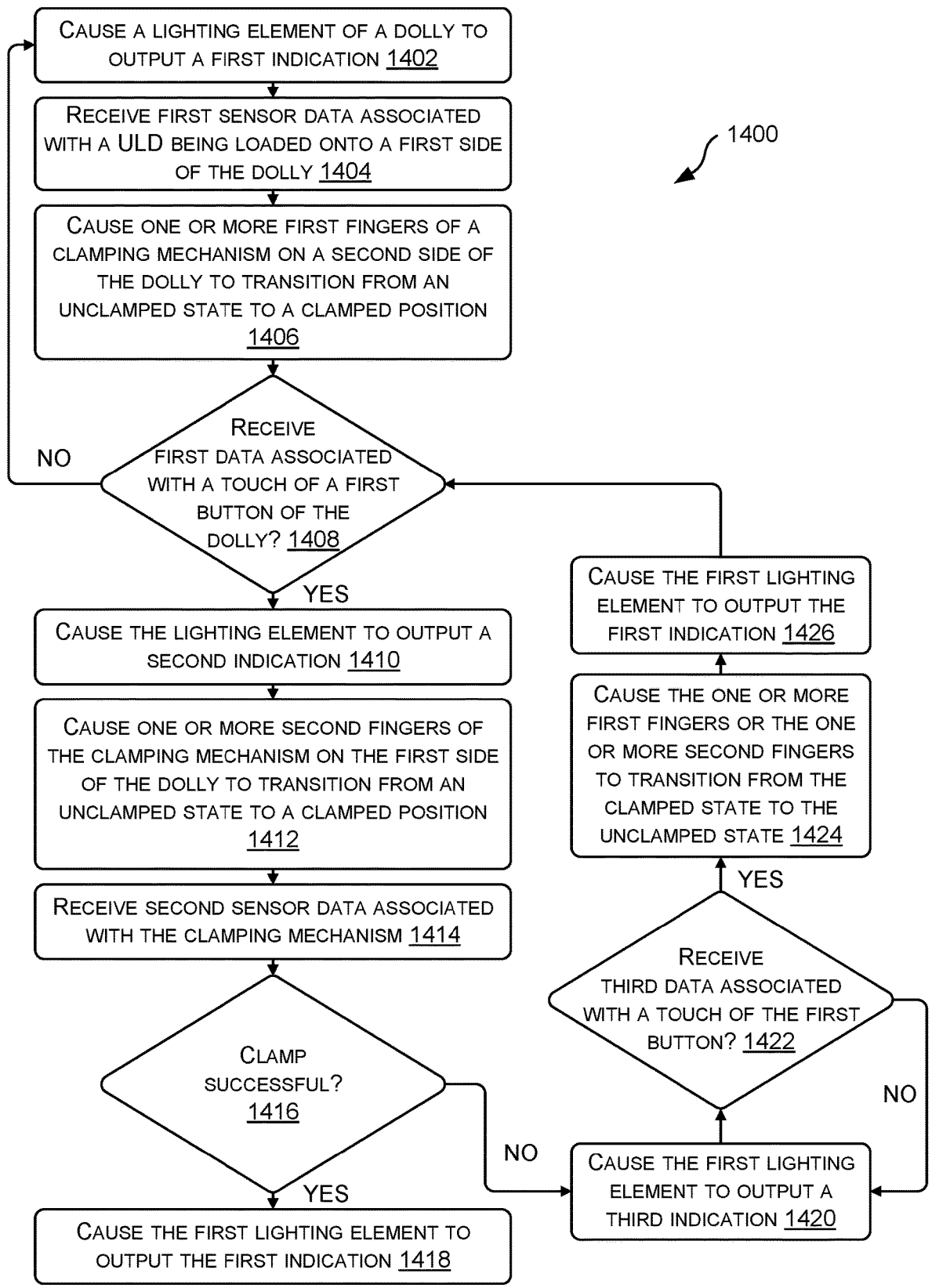
FIG. 14 illustrates an example process for controlling the clamping mechanism(s) of the dolly of FIG. 1, according to an example of the present disclosure.

FIGS. 12-14 illustrate various processes related to clamping and unclamping the ULD 102 from the dolly 100. The processes described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, devices, and systems described in the examples herein, such as, for example those described with respect to FIGS. 1-11B, although the processes may be implemented in a wide variety of other environments, architectures, devices, and systems.

FIG. 12 illustrates an example process 1200 for loading a ULD onto the dolly 100, according to examples of the present disclosure.

At 1202, the process 1200 may include causing lighting element(s) of a dolly to output a first indication. For example, when the first finger(s) 116(1) and/or the second finger(s) 116(2) are in the unclamped position, or the dolly 100 is configured to receive the ULD 102, the lighting element(s) 130 may output the first indication. In some instances, outputting the first indication may include a first lighting element associated with the first button 126(1) and/or a second lighting element associated with the third button 126(3) illuminating to a first color (e.g., green). Illuminating the first lighting element and the second lighting element green indicates that the ULD 102 may be loaded onto the dolly 100.

At 1204, the process 1200 may include determining whether first data was received associated with a touch of first button of the dolly. For example, pressing the first button 126(1) or the third button 126(3) may generate sensor data 138 that indicates whether the first button 126(1) or the third button 126(3) was pressed. Given that, at 1204, the finger(s) 116 may be in the unclamped position, the first button 126(1) or the third button 126(3) may be pressed to move the finger(s) 116 to the clamped position to secure the ULD 102 to the dolly 100. If at 1204 the process 1200 determines that the first data was not received, the process 1200 may follow the "NO" route and loop to 1202, whereby the lighting element(s) 130 may continue to output the first indication until the first button 126(1) or the third button 126(3) is pressed unload the ULD 102. If so, at the first button 126(1) or the third button 126(3) is pressed unload the ULD 102, the process 1200 may follow the "YES" route and proceed to 1204.

At 1206, the process 1200 may cause the lighting element(s) to output a second indication. For example, in response to the first button 126(1) or the third button 126(3) being pressed, the lighting element(s) 130 may illuminate. In some instances, following a press of the first button 126(1) or the third button 126(3), the lighting element(s) 130 may illuminate to a second color different than the first color associated with the first indication. For example, the lighting element(s) 130 may illuminate yellow to indicate a press of the first button 126(1) or the third button 126(3). In some instances, only the lighting element disposed beneath the first button 126(1) or the third button 126(3), whichever button was pressed, may output the second indication. For example, if the first button 126(1) was pressed to clamp the first finger(s) 116(1), the first lighting element disposed beneath the first button 126(1) may be illuminated yellow. Comparatively, if the third button 126(2) was pressed to clamp the second finger(s) 116(2), the second lighting element disposed beneath the third button 126(3) may be illuminated yellow. Causing the lighting element(s) to output the second indication may serve to provide a visual feedback to an operator that the press was received.

At 1208, the process 1200 may include causing one or more finger(s) of a clamping mechanism of the dolly to transition from an unclamped position to a clamped position. For example, following a loading of the ULD 102, and pressing the first button 126(1) or the third button 126(3), may cause the first finger(s) 116(1) and/or the second finger(s) 116(2) to be actuated and clamp the ULD 102. In some instances, those finger(s) 116 associated with the button pressed may be transition to the clamped position. For example, if the first button 126(1) was pressed, the first finger(s) 116(1) may move to the clamped position, and if the third button 126(3) was pressed, the second finger(s) 116(2) may move to the clamped position. However, in some instances, in response to a press of the first button 126(1) (or the third button 126(3)), both the first finger(s) 116(1) and the second finger(s) 116 may be moved to center the ULD 102 on the dolly 100, for example.

In some instances, at 1208, one of the first finger(s) 116(1) or the second finger(s) 116(2) may already be in the clamped position. For example, if a previous ULD was unloaded from the first side 108, the first finger(s) 116(1) may be in the unclamped position and the second finger(s) 116(2) may be in the clamped position. If the ULD 102 is loaded onto the first side 108, given that the first finger(s) 116(1) are in the unclamped position, then only the first finger(s) 116(1) may need to be moved to the clamped position. In this scenario, the second finger(s) 116(2) may provide a bulkhead against which the ULD 102 is brough into contact with as the ULD 102 is loaded onto the dolly 100. For example, having the second finger(s) 116(2) in the clamped position may prevent the ULD 102 rolling or sliding off the second side 110.

At 1210, the process 1200 may include receiving sensor data associated with the clamping mechanism. For example, the sensor(s) 128 may generate the sensor data 138 that is used to determine whether the clamp of the ULD 102 was successful. In some instances, the sensor data 138 may represent an amount of current, resistance, or torque applied by the motor(s) 124. Additionally, the sensor data 138 may represent a displacement, or amount of movement, of the chain(s), sprocket(s), and/or finger(s) 116. Still, in some instances, the sensor data 138 may represent an amount of weight loaded onto the dolly 100, a positioning of the ULD 102 on the dolly 100, and so forth.

At 1212, the process 1200 may include determining whether the clamp was successful. For example, whether the clamp of the ULD 102 was successful may be based at least in part on the sensor data 138. In some instances, to determine whether the clamp was successful may involve comparing the sensor data 138 to the threshold data 140. For example, the threshold data 140 may indicate an amount of travel of the finger(s) 116 (whether the first finger(s) 116(1) and/or the second finger(s) 116(2)) between the unclamped state and the clamped state, as well as an amount of current drawn by the motor(s) 124 to move the finger(s) 116 to the clamped state. The sensor data 138 and the threshold data 140 may be compared to determine whether the first finger(s) 116(1) and the second finger(s) 116(2) traveled their respective distances from the unclamped state to the clamped state. Additionally, if the current draw on the motor(s) is less than a threshold range, this may indicate that one of the finger(s) 116 has not clamped onto the ULD 102. For example, one of the finger(s) 116 may have passed underneath the ULD 102 during clamping.

Comparatively, if the current draw by the motor(s) is within the threshold range, the finger(s) may be determined to have engaged with the ULD 102. For example, when engaged and holding the ULD 102, the motor(s) 124 apply a certain force to secure the finger(s) 116 in place to prevent the ULD 102 moving. In some instances, both the travel distance of the finger(s) 116 and/or the amount of current drawn by the motor(s) 124 may be used to determine whether the clamp was successful. For example, if the finger(s) 116 are able to move the amount of travel without experiencing a current(s) that is greater than a predetermined threshold, the clamping mechanism(s) 114 may have successfully unclamped the ULD 102. If the finger(s) 116 are unable to move the amount of travel and/or experience a current(s) that is greater than a predetermined threshold, the clamping mechanism(s) 114 may have unsuccessfully unclamped the ULD 102. If at 1212 the process 1200 determines that the clamp was successful, the process 1200 may follow the "YES" route and proceed to 1214.

At 1214, the process 1200 may include causing the lighting element(s) to output the first indication. For example, following a successful clamp of the ULD 102, the lighting element(s) 130 may illuminate to green. In some instances, both the first lighting element disposed beneath the first button 126(1) and the second lighting element disposed beneath the third button 126(3) may illuminate green. Such indication may visually indicate that the ULD 102 is safely clamped to the dolly 100 and capable of being transported. Additionally, in some instances, in response to determining that the ULD 102 was successfully clamped, the braking mechanism 132 of the dolly 100 may be released to permit the dolly 100 to be towed.

Alternatively, if at 1212 the process 1200 determine that the clamp was unsuccessful, the process 1200 may follow the "NO" route and proceed to 1216. At 1216, the process 1200 may include causing the lighting element(s) to output a third indication. For example, the lighting element(s) 130 may illuminate to a third color different than the first color associated with the first indication and/or the second color associated with the second indication. For example, the lighting element(s) 130 may illuminate red to indicate that the clamp of the ULD 102 was unsuccessful. In some instances, both the first lighting element disposed beneath the first button 126(1) or the second lighting element disposed beneath the third button 126(3) may illuminate red. However, in some instances, if the first finger(s) 116(1) unsuccessfully clamped the ULD 102, the first lighting element disposed beneath the first button 126(1) may illuminate red. In such instances, if the second finger(s) 116(2) successfully clamped the ULD 102, the ULD 102, the second lighting element disposed beneath the third button 126(3) may illuminate green. Alternatively, if the second finger(s) 116(2) unsuccessfully clamped the ULD 102, the second lighting element disposed beneath the third button 126(3) may illuminate red. In such instances, if the first finger(s) 116(1) successfully clamped the ULD 102, the ULD 102, the first lighting element disposed beneath the first button 126(1) may illuminate green.

At 1218, the process 1200 may include determining whether second data associated with a touch of the first button was received. For example, in response to an unsuccessful clamp, the operator may press the first button 126(1) or the third button 126(3). In some instances, the button press at 1218 may be the same or different button that the operator pressed at 1204. Pressing the first button 126(1) or the third button 126(3) may serve to reset the clamping mechanism(s) 114 in order to reattempt to secure the ULD 102 to the dolly 100. For example, if the first finger(s) 116(1) did not successfully clamp the ULD 102, the operator may press the first button 126(1) to move the first finger(s) 116(1) back to the unclamped state, and thereafter, reattempt to successfully clamp the ULD 102.

If at 1218, second data associated with a touch of the first button was not received, the process 1200 may follow the "NO" route and loop to 1216 to cause the lighting element(s) 130 to continue to output the third indication. Comparatively, if at 1218 the second data was received, the process 1200 may follow the "YES" route and proceed to 1220.

At 1220, the process 1200 may include the causing one or more finger(s) of the clamping mechanism to transition from the clamped position to the unclamped position. For example, after the unsuccessful clamp, and pressing the first button 126(1) or the third button 126(3), may cause the first finger(s) 116(1) and/or the second finger(s) 116(2) to be actuated and unclamp the ULD 102. In some instances, those finger(s) 116 associated with the button pressed may be transitioned to the unclamped position. For example, if the first button 126(1) was pressed, the first finger(s) 116(1) may move to the unclamped position, and if the third button 126(3) was pressed, the second finger(s) 116(2) may move to the unclamped position. However, in some instances, in response to an unsuccessful clamp, both the first finger(s) 116(1) and the second finger(s) 116(3) may move to the unclamped position. In some instances, the finger(s) 116 of the clamping mechanism(s) 114 moved at 1220 may not be the same as the finger(s) 116 of the clamping mechanism(s) 114 moved at 1208.

From 1220, the process 1200 may continue to 1202, whereby after the first finger(s) 116(1) or the second finger(s) 116(2) move to the unclamped position, the lighting element(s) 130 may illuminate green to indicate that the clamping mechanism(s) 114 is unclamped. Therein, the operator may press the first button 126(1) or the third button 126(3) in an attempt to re-clamp (successfully) the ULD 102.

In some instances, the process may continue to 1216 following a press of a second button. For example, at 1222, the process 1200 may include receiving third data associated with a touch of a second button of the dolly was received. The second button may represent the second button 126(2) or the fourth button 126(4) corresponding to the emergency stop of the dolly 100. For example, the operator may pull or push on the second button 126(2) or the fourth button 126(4) to indicate an emergency stop. In response, the lighting element(s) 130 may illuminate red to indicate that the emergency stop button was pressed. In some instances, the emergency stop button may not be pressed while the dolly 100 is in motion, but rather, upon the operator noticing that the clamp of the ULD 102 was unsuccessful. In some instances, the second button 126(2) or the fourth button 126(4) may be incapable of being pressed, or carried out, if the dolly 100 is in motion. For example, if the dolly 100 is moving when the second button 126(2) or the fourth button 126(4) is pressed, the braking mechanism 132 may not be engaged.

In some instances, although at 1218 the process 1200 is described as receiving second data associated with the touch for causing the one or more fingers to transition to the unclamped position, the dolly 100 may attempt to re-clamp the ULD 102 following the unsuccessful clamp. For example, after first finger(s) 116(1) or the second finger(s) 116(2) unsuccessfully clamp the ULD 102, the first finger(s) 116(1) and/or the second finger(s) 116(2) may move to the unclamped position, and thereafter, the first finger(s) 116(1)

and/or the second finger(s) 116(2) may move to the clamped position. Here, the operator may not press the first button 126(1) and/or the third button 126(3), but trying to clamp the ULD 102 again may be performed autonomously in response to the unsuccessful clamp.

FIG. 13 illustrates an example process 1200 for unloading a ULD from the dolly 100, according to examples of the present disclosure.

At 1302, the process 1300 may include causing lighting element(s) of a dolly to output a first indication. For example, when the first finger(s) 116(1) and/or the second finger(s) 116(2) are in the clamped position, or the dolly 100 is clamping the ULD 102, the lighting element(s) 130 may output the first indication. In some instances, outputting the first indication may include a first lighting element associated with the first button 126(1) and a second lighting element associated with the third button 126(3) illuminating to a first color (e.g., green). Illuminating the first lighting element and the second lighting element green indicates that the finger(s) 116 are successfully clamping the ULD 102. Such determination may be made at least in part via sensor data 138 received from the sensor(s) 128 for knowing whether the motor(s) 124 are applying an amount of current within the threshold range to clamp the ULD 102 to the dolly 100, whether the finger(s) 116 have moved after clamping, whether the ULD 102 has moved after clamping, and so forth. In some instances, the first lighting element and/or the second lighting element may output the first indication.

At 1304, the process 1300 may include determining whether first data was received associated with a touch of a first button of the dolly. For example, pressing the first button 126(1) or the third button 126(3) may generate sensor data 138 that indicates whether the first button 126(1) or the third button 126(3) was pressed. Given that, at 1304 the finger(s) 116 may be in the clamped position, the first button 126(1) or the third button 126(3) may be pressed to move the finger(s) 116 to the unclamped position to unload the ULD 102 from the dolly 100. If at 1304 the process 1300 determines that the first data was not received, the process 1300 may follow the "NO" route and loop to 1302, whereby the lighting element(s) 130 may continue to output the first indication until the first button 126(1) or the third button 126(3) is pressed to unload the ULD 102. If so, if the first button 126(1) or the third button 126(3) is pressed unload the ULD 102, the process 1300 may follow the "YES" route and proceed to 1306.

At 1306, the process 1300 may include causing the lighting element(s) to output a second indication. For example, in response to the first button 126(1) or the third button 126(3) being pressed, the lighting element(s) 130 may illuminate. In some instances, following a press of the first button 126(1) or the third button 126(3), the lighting element(s) 130 may illuminate to a second color different than the first color associated with the first indication. For example, the lighting element(s) 130 may illuminate yellow to indicate a press of the first button 126(1) or the third button 126(3). In some instances, only the lighting element disposed beneath the first button 126(1) or the third button 126(3), whichever button was pressed, may output the second indication. For example, if the first button 126(1) was pressed to unclamp the first finger(s) 116(1), the first lighting element disposed beneath the first button 126(1) may be illuminated yellow. Comparatively, if the third button 126(3) was pressed to unclamp the second finger(s) 116(2), the second lighting element disposed beneath the third button 126(3) may be illuminated yellow. Causing the lighting element(s) to output the second indication may serve to provide a visual feedback to an operator that the press was received.

At 1308, the process 1300 may include causing one or more first finger(s) of a clamping mechanism of the dolly to transition from a clamped position to an unclamped position. For example, to unload the ULD 102, pressing the first button 126(1) or the third button 126(3), may cause the first finger(s) 116(1) and/or the second finger(s) 116(2) to be actuated and unclamp the ULD 102. In some instances, those finger(s) 116 associated with the button pressed may be transition to the unclamped position. For example, if the ULD 102 is being unloaded from the first side 108 of the dolly 100, the first button 126(1) may be pressed to move the first finger(s) 116(1) from the clamped position to the unclamped position. Alternatively, if the ULD 102 is being unloaded from the second side 110 of the dolly 100, the third button 126(3) may be pressed to move the second finger(s) 116(2) to the unclamped position.

At 1310, the process 1300 may include causing the lighting element(s) to output a third indication. For example, in response to the first button 126(1) or the third button 126(3) being pressed, and after the lighting element(s) 130 output the second indication, the lighting element(s) 130 may output a third indication. In some instances, the lighting element(s) 130 may output the third indication after the first finger(s) 116(1) or the second finger(s) 116(2) have moved to the unclamped position. For example, following the press of the first button 126(1) or the third button 126(3), and a subsequent movement of the first finger(s) 116(1) or the second finger(s) 116(2) to the unclamped position, the lighting element(s) 130 may output the third indication. In some instances, the third indication may include the lighting element(s) 130 illuminating orange. In some instances, the third indication may be output for a certain period of time (e.g., thirty seconds).

At 1312, the process 1300 may cause the lighting element(s) to output the first indication. For example, after outputting the third indication for the certain period of time, the lighting element(s) 130 may output the first indication (e.g., green). In some instances, outputting the first indication after the first finger(s) 116(1) or the second finger(s) 116(2) have moved to the unclamped position serves to indicate that the ULD 102 may be unloaded, or that another ULD may be loaded onto the dolly 100.

At 1314, the process 1300 may include determining whether second data was received associated with a touch of a second button of the dolly. For example, if the touch of the first button at 1304 was associated with the first button 126(1), at 1314, the process 1300 may determine whether a touch is received at the third button 126(3). For example, the third button 126(3) may be pressed to move the second finger(s) 116(2) to the unclamped position after the first finger(s) 116(1) have moved to the unclamped position (at 1304). If second data was not received associated with the touch of the second button, the process 1300 may follow the "NO" route and loop back to 1312. Alternatively, if at 1314 the second data was received, the process 1300 may follow the "YES" route and proceed to 1316.

At 1316, the process 1300 may include determining whether the ULD is still loaded on the dolly. For example, using the sensor data 138 generated by the sensor(s) 128, the process 1300 may determine whether the ULD 102 is still loaded on the dolly 100. The sensor data 138 may be generated via proximity sensor(s), weight sensor(s), and so forth. Here, because the first finger(s) 116(1) have already been moved to the unclamped position, if the ULD 102 remains on the deck, moving the second finger(s) 116(2) to the unclamped position may no longer provide a bulkhead for the ULD 102. Consequently, in some instances, moving the second finger(s) 116(2) to the unclamped position (with the first finger(s) 116(1) already in the unclamped position) may result in the ULD 102 sliding off the deck 112. In some instances, only one of the first finger(s) 116(1) or the second finger(s) 116(2) may be in the unclamped position when the ULD 102 is loaded/present on the dolly 100. If at 1316 the process 1300 determines that the ULD 102 is still loaded on the dolly 100, the process 1300 may follow the "YES" route and proceed to 1318.

At 1318, the process 1300 may include causing the lighting element(s) to output a fourth indication. For example, the lighting element(s) 130 may illuminate to a fourth indication (e.g., red) to signify that the second finger(s) 116 cannot be moved to the unclamped position. In some instances, the third lighting element beneath the third button 126(3) may illuminate red, and/or the first lighting element disposed beneath the first button 126(1) may illuminate red.

Comparatively, if at 1316 the process 1300 determines that the ULD 102 is not loaded on the dolly 100, the process 1300 may follow the "NO" route and proceed to 1322.

At 1322, the process 1300 may include causing one or more second finger(s) of the clamping mechanism of the dolly to transition from a clamped position to an unclamped position. For example, pressing the third button 126(3), and in response to determining that the ULD 102 is not loaded onto the dolly 100, may cause the second finger(s) 116(2) to be actuated and unclamp from the ULD 102.

At 1324, the process 1300 may include causing the lighting element(s) to output the first indication. For example, after outputting the third indication for the certain period of time, the lighting element(s) 130 may output the first indication (e.g., green). In some instances, outputting the first indication after the first finger(s) 116(1) or the second finger(s) 116(2) have moved to the unclamped position serves to indicate that the ULD 102 may be unloaded, or that another ULD may be loaded onto the dolly 100. In some instances, at 1324, the second lighting element under the third button 126(3) may output the first indication (from red), whereas the first lighting element under the first button 126(1) may have output the first indication at 1312. At such, at 1324, the third lighting element under the third button 126(3) may switch from illuminate red (or after yellow and/or orange following the press), to illuminating green.

FIG. 1400 illustrates an example process 1400 for loading a ULD onto the dolly 100, according to examples of the present disclosure.

At 1402, the process 1400 may include causing lighting element(s) of a dolly to output a first indication. For example, when the first finger(s) 116(1) and/or the second finger(s) 116(2) are in the unclamped position, or the dolly 100 is configured to receive the ULD 102, the lighting element(s) 130 may output the first indication. In some instances, outputting the first indication may include a first lighting element associated with the first button 126(1) and a second lighting element associated with the third button 126(3) illuminating to a first color (e.g., green). Illuminating the first lighting element and the second lighting element green indicates that the ULD 102 may be loaded onto the dolly 100.

At 1404, the process 1400 may include receiving first sensor data associated with a ULD being loaded onto a first side of the dolly. In some instances, the first sensor data may be generated by the sensor(s) 128 (e.g., weight sensor, imaging sensor, proximity sensor, accelerometer, etc.) indicative of the ULD 102 being loaded onto the first side 108 of the dolly 100.

At 1406, the process 1400 may include causing one or more first finger(s) of a clamping mechanism on a second side of the dolly to transition from an unclamped position to a clamped position. For example, following a loading of the ULD 102 onto the first side 108, the second finger(s) 116(2) on the second side 110 may actuate to provide a bulkhead against which the ULD 102 may contact. The second finger(s) 116 may therefore more to the clamped position (or at least partially into the clamped position) to prevent the ULD 102 sliding off the second side 110 as the ULD 102 is loaded onto the dolly 100. Alternatively, if the second finger(s) 116(2) were not in the clamped position (or disposed above the deck 112), the ULD 102 may fall of the dolly 100.

At 1408, the process 1400 may include determining whether first data was received associated with a touch of a first button of the dolly. For example, in instances in which the ULD 102 was loaded onto the first side 108, the operator may press the first button 126(1) to move the finger(s) 116 to the clamped position to secure the ULD 102 to the dolly 100. If at 1404 the process 1400 determines that the first data was not received, the process 1400 may follow the "NO" route and loop to 1402, whereby the lighting element(s) 130 may continue to output the first indication until the first button 126(1) or the third button 126(3) is pressed. If so, at 1408 the first button 126(1) is pressed, the process 1400 may follow the "YES" route and proceed to 1410.

At 1410, the process 1400 may cause the lighting element(s) to output a second indication. For example, in response to the first button 126(1) being pressed, the lighting element(s) 130 may illuminate. In some instances, following a press of the first button 126(1) or the third button 126(3), the lighting element(s) 130 may illuminate to a second color different than the first color associated with the first indication. For example, the lighting element(s) 130 may illuminate yellow to indicate a press of the first button 126(1).

At 1412, the process 1400 may include causing one or more second finger(s) of the clamping mechanism on the first side of the dolly to transition from an unclamped position to a clamped position. For example, following a loading of the ULD 102 onto the first side 108 and pressing of the first button 126(1), the first finger(s) 116(1) on the first side 108 may actuate to clamp the ULD 102.

At 1414, the process 1400 may include receiving sensor data associated with the clamping mechanism. For example, the sensor(s) 128 may generate the sensor data 138 that is used to determine whether the clamp of the ULD 102 was successful. In some instances, the sensor data 138 may represent an amount of current, resistance, or torque applied by the motor(s) 124. Additionally, the sensor data 138 may represent a displacement, or amount of movement, of the chain(s), sprocket(s), and/or finger(s) 116. Still, in some instances, the sensor data 138 may represent an amount of weight loaded onto the dolly 100, a positioning of the ULD 102 on the dolly 100, and so forth.

At 1416, the process 1400 may include determining whether the clamp was successful. For example, whether the clamp of the ULD 102 was successful may be based at least in part on the sensor data 138. In some instances, to determine whether the clamp was successful may involve comparing the sensor data 138 to the threshold data 140. For example, the threshold data 140 may indicate an amount of travel of the finger(s) 116 (whether the first finger(s) 116(1) and/or the second finger(s) 116(2)) between the unclamped state and the clamped state, as well as an amount of current drawn by the motor(s) 124 to move the finger(s) 116 to the clamped state. If at 1416 the process 1400 determines that the clamp was successful, the process 1400 may follow the "YES" route and proceed to 1418.

At 1418, the process 1400 may include causing the lighting element(s) to output the first indication. For example, following a successful clamp of the ULD 102, the lighting element(s) 130 may illuminate to green. In some instances, both the first lighting element disposed beneath the first button 126(1) and the second lighting element disposed beneath the third button 126(3) may illuminate green. Such indication may visually indicate that the ULD 102 is safely clamped to the dolly 100 and capable of being transported.

Alternatively, if at 1416 the process 1400 determines that the clamp was unsuccessful, the process 1400 may follow the "NO" route and proceed to 1420. At 1420, the process 1400 may include causing the lighting element(s) to output a third indication. For example, the lighting element(s) 130 may illuminate to a third color different than the first color associated with the first indication and/or the second color associated with the second indication. For example, the lighting element(s) 130 may illuminate red to indicate that the clamp of the ULD 102 was unsuccessful. In some instances, both the first lighting element disposed beneath the first button 126(1) or the second lighting element disposed beneath the third button 126(3) may illuminate red.

At 1422, the process 1400 may include determining whether second data associated with a touch of the first button was received. For example, in response to unsuccessful clamp, the operator may press the first button 126(1) or the third button 126(3). In some instances, the button press at 1422 may be the same or different button that the operator pressed at 1204. Pressing the first button 126(1) or the third button 126(3) may serve to reset the clamping mechanism(s) 114 in order to reattempt to secure the ULD 102 to the dolly 100. For example, if the first finger(s) 116(1) did not successfully clamp the ULD 102, the operator may press the first button 126(1) to move the first finger(s) 116(1) back to the unclamped state, and thereafter, reattempt to successfully clamp the ULD 102.

If at 1424, second data associated with a touch of the first button was not received, the process 1400 may follow the "NO" route and loop to 1422 to cause the lighting element(s) 130 to continue to output the third indication. Comparatively, if at 1422 the second data was received, the process 1400 may follow the "YES" route and proceed to 1424.

At 1426, the process 1400 may include the causing one or more finger(s) or the second finger(s) of the clamping mechanism to transition from the clamped position to the unclamped position. For example, after the unsuccessful clamp, and pressing the first button 126(1) or the third button 126(3), may cause the first finger(s) 116(1) and/or the second finger(s) 116(2) to be actuated and unclamp the ULD 102. In some instances, only one of the first finger(s) 116(1) or the second finger(s) 116(2) may be moved to the unclamped position to prevent the ULD 102 rolling off the deck.

From 1426, the process 1400 may continue to 1202, whereby after the first finger(s) 116(1) or the second finger(s) 116(2) move to the unclamped position, the lighting element(s) 130 may illuminate green to indicate that the clamping mechanism(s) 114 is unclamped. Therein, the operator may press the first button 126(1) or the third button 126(3) in an attempt to re-clamp (successfully) the ULD 102.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:
1. A dolly, comprising:
a deck configured to receive a unit load device (ULD);
a clamping mechanism including:
  first fingers,
  a first motor operably coupled to the first fingers, the first motor being configured to transition the first fingers between a first position in which the first fingers are engaged with a first side of the ULD to clamp the ULD to the deck, and a second position in which the first fingers are disengaged from the first side of the ULD to unclamp the ULD from the deck,
  second fingers, and
  a second motor operably coupled to the second fingers, the second motor being configured to transition the second fingers between a third position in which the second fingers are engaged with a second side of the ULD to clamp the ULD to the deck, and a fourth position in which the second fingers are disengaged from the second side of the ULD to unclamp the ULD from the deck,
a first button configured to cause the first motor to transition the first fingers between the first position and the second position;
a first lighting element disposed beneath or within the first button;
a second button configured to cause the second motor to transition the second fingers between the third position and the fourth position;
a second lighting element disposed beneath or within the second button;
one or more processors; and
one or more non-transitory computer-readable media storing computer-executable instructions that, when executed by the one or more processors, cause the one or more processors to perform operations comprising:
  receiving data from the first button,
  based on the receiving the data:
    causing the first lighting element to illuminate to a first color, and
    causing the first fingers to transition from the second position to the first position, and
    causing the first lighting element to illuminate to a second color that is different than the first color.

2. The dolly of claim 1, wherein:
the clamping mechanism further includes:
a first shaft coupled to the first motor,
first sprockets disposed about the first shaft,
second sprockets,
first chains wrapped about first individual sprockets of the first sprockets and second individual sprockets of the second sprockets,
a second shaft coupled to the second motor,
third sprockets disposed about the second shaft,
fourth sprockets, and
second chains wrapped about third individual sprockets of the third sprockets and fourth individual sprockets of the fourth sprockets;
first actuation of the first motor in a first direction rotates the first shaft in the first direction and causes the first chains to rotate about the first sprockets and the second sprockets to move the first fingers to the first position;
second actuation of the first motor in a second direction rotates the first shaft in the second direction and causes the first chains to rotate about the first sprockets and the second sprockets to move the first fingers to the second position;
third actuation of the second motor in a third direction rotates the second shaft in the third direction and causes the second chains to rotate about the third sprockets and the fourth sprockets to move the second fingers to the third position; and
fourth actuation of the second motor in a fourth direction rotates the second shaft in the fourth direction and causes the second chains to rotate about the third sprockets and the fourth sprockets to move the second fingers to the fourth position.

3. The dolly of claim 1, the operations further comprising:
receiving second data from the at least one of the first button or the second button;
based on the receiving the second data:
causing the first lighting element to illuminate to the first color, and
causing the first fingers to transition from the first position to the second position;
causing the first lighting element to illuminate to a third color that is different than the second color; and
causing the first lighting element or the second lighting element to illuminate to the second color.

4. The dolly of claim 1, wherein the dolly includes a first end and a second end opposite the first end, further comprising at least one:
a first bulkhead located at the first end, the first bulkhead including:
a first section,
a second section, and
a third section,
wherein the first section and the third section extend transverse to the second section; or
a second bulkhead located at the second end, the second bulkhead including:
a fourth section,
a fifth section, and
a sixth section,
wherein the fourth section and the sixth section extend transverse to the fifth section.

5. A device, comprising:
a deck configured to receive a container;
a clamping mechanism configured to clamp the container to the deck and unclamp the container from the deck, the clamping mechanism including:
one or more first fingers that are actuatable between a first position to clamp the container to the deck, and a second position to unclamp the container from the deck, and
one or more second fingers that are actuatable between a third position to clamp the container to the deck, and a fourth position to unclamp the container from the deck;
an input component to at least partially control an actuation of at least one of the one or more first fingers or the one or more second fingers; and
an output component configured to output an indication according to an operational status of the clamping mechanism.

6. The device of claim 5, wherein the input component controls the actuation of the one or more first fingers between the first position and the second position, further comprising a second input component that controls a second actuation of the one or more second fingers between the third position and the fourth position.

7. The device of claim 6, wherein the output component comprises a lighting element that is configured to illuminate according to the operational status of the one or more first fingers, the lighting element residing at least one of on, within, or beneath the input component, further comprising a second lighting element configured to illuminate according to a second operational status of the one or more second fingers, the second lighting element residing at least one of on, within, or beneath the second input component.

8. The device of claim 5, wherein:
the deck includes a first side and a second side;
the one or more first fingers are arranged along the first side; and
the one or more second fingers are arranged along the second side.

9. The device of claim 8, wherein the device includes a first end and a second end, further comprising a bulkhead disposed vertically above the deck on at least one of the first end or the second end, the bulkhead including:
a first section,
a second section, and
a third section,
wherein the first section and the third section extend transverse to the second section.

10. The device of claim 5, wherein:
the deck defines a rolling surface on which the container is configured to move;
in the first position, the one or more first fingers are disposed vertically above the rolling surface;
in the second position, the one or more first fingers are disposed vertically below the rolling surface;
in the third position, the one or more second fingers are disposed vertically above the rolling surface; and
in the fourth position, the one or more second fingers are disposed vertically below the rolling surface.

11. The device of claim 5, further comprising:
a first shaft;
at least a first motor coupled to the first shaft;
one or more first sprockets disposed about the first shaft;
one or more second sprockets;
one or more first chains disposed about first individual sprockets of the one or more first sprockets and second individual sprockets of the one or more second sprockets;

a second shaft;

at least a second motor coupled to the second shaft;

one or more third sprockets disposed about the second shaft;

one or more fourth sprockets; and one or more second chains disposed about third individual sprockets of the one or more third sprockets and fourth individual sprockets of the one or more fourth sprockets.

12. The device of claim 11, wherein:

first individual fingers of the one or more first fingers are coupled to first individual chains of the one or more first chains;

second individual fingers of the one or more second fingers are coupled to second individual chains of the one or more second chains;

first actuation of the at least the first motor in a first direction rotates the first shaft in the first direction and causes the first individual chains of the one or more first chains to rotate about the first individual sprockets of the one or more first sprockets and the second individual sprockets of the one or more second sprockets to move the one or more first fingers to the first position;

second actuation of the at least the first motor in a second direction rotates the first shaft in the second direction and causes the first individual chains of the one or more first chains to rotate about the first individual sprockets of the one or more first sprockets and the second individual sprockets of the one or more second sprockets to move the one or more first fingers to the second position;

third actuation of the at least the second motor in a third direction rotates the second shaft in the third direction and causes the second individual chains of the one or more second chains to rotate about the third individual sprockets of the one or more third sprockets and the fourth individual sprockets of the one or more fourth sprockets to move the one or more second fingers to the third position; and fourth actuation of the at least the second motor in a fourth direction rotates the second shaft in the fourth direction and causes the second individual chains of the one or more second chains to rotate about the third individual sprockets of the one or more third sprockets and the fourth individual sprockets of the one or more fourth sprockets to move the one or more second fingers to the fourth position.

13. The device of claim 5, further comprising:

one or more processors; and one or more non-transitory computer-readable media storing computer-executable instructions that, when executed by the one or more processors, cause the one or more processors to perform operations comprising:

receiving data from the input component, and based at least in part on the receiving the data:

causing the output component to output the indication, and causing the one of more first fingers to transition from the second position to the first position.

14. The device of claim 13, further comprising one or more sensors, the operations further comprising:

receiving sensor data from the one or more sensors associated with at least one of:

a distance of travel of the one or more first fingers, or a current of at least one motor that operably couples to the one or more first fingers; and based at least in part on the sensor data, causing the output component to output a second indication that is different than the indication.

15. The device of claim 13, the operations further comprising:

causing the output component to output a second indication that is different than the indication;

receiving second data from the input component;

based at least in part on the receiving the second data:

causing the output component to output a third indication that is different than the second indication, and causing the one or more first fingers to transition from the first position to the second position; and causing the output component to output the indication.

16. A dolly, comprising:

a deck configured to receive a container;

a clamping mechanism configured to transition between a clamped position in which the clamping mechanism clamps the container to the deck, and an unclamped position in which the clamping mechanism unclamps the container from the deck;

an input component configured to control an operation of the clamping mechanism between the clamped position and the unclamped position; and an output component configured to output an indication according to an operational status of the clamping mechanism.

17. The dolly of claim 16, wherein:

the clamping mechanism includes fingers that clamp and unclamp the container;

the deck includes a rolling surface on which the container is configured to rest;

in the clamped position, the fingers reside vertically above the rolling surface; and in the unclamped position, at least a portion of the fingers reside vertically below the rolling surface.

18. The dolly of claim 16, wherein the clamping mechanism includes:

sprockets;

at least one motor; and chains, wherein:

the at least one motor is configured to actuate in a first direction to rotate the sprockets to move the chains and transition the clamping mechanism to the clamped position, and the at least one motor is configured to actuate in a second direction to rotate the sprockets to move the chains and transition the clamping mechanism to the unclamped position.

19. The dolly of claim 16, further comprising:

one or more processors; and one or more non-transitory computer-readable media storing computer-executable instructions that, when executed by the one or more processors, cause the one or more processors to perform operations comprising:

receiving data from the input component, based at least in part on the receiving the data:

causing the output component to output the indication, and causing the clamping mechanism to transition from the clamped position to the unclamped position.

20. The dolly of claim 19, the operations further comprising:
  receiving second data from the input component,
  based at least in part on the receiving the data:
    causing the output component to output a second indication that is different than the indication, and
    causing the clamping mechanism to transition from the clamped position to the unclamped position;
  causing the output component to output a third indication for a threshold amount of time, the third indication being different than the second indication; and
  causing the output component to output the indication after the output component outputs the third indication for the threshold amount of time.

* * * * *